(12) United States Patent
Ito

(10) Patent No.: US 11,092,862 B2
(45) Date of Patent: Aug. 17, 2021

(54) ELECTRO-OPTICAL DEVICE AND ELECTRONIC APPARATUS

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/448,150

(22) Filed: Jun. 21, 2019

(65) Prior Publication Data

US 2019/0391453 A1 Dec. 26, 2019

(30) Foreign Application Priority Data

Jun. 22, 2018 (JP) .............................. JP2018-118642

(51) Int. Cl.
*G02F 1/1362* (2006.01)
*G02F 1/1345* (2006.01)
*G02F 1/1368* (2006.01)

(52) U.S. Cl.
CPC ...... *G02F 1/136209* (2013.01); *G02F 1/1368* (2013.01); *G02F 1/13458* (2013.01); *G02F 1/13685* (2021.01)

(58) Field of Classification Search
CPC ........... G02F 1/136209; G02F 1/13458; G02F 1/1368; H01L 29/78633
See application file for complete search history.

(56) References Cited

U.S. PATENT DOCUMENTS

| 5,960,310 | A | * | 9/1999 | Jeong | .................. H01L 21/7684 438/622 |
| 2002/0036818 | A1 | * | 3/2002 | Kawata | ............. G02F 1/136209 359/254 |
| 2005/0056934 | A1 | | 3/2005 | Suzawa et al. | |
| 2005/0266593 | A1 | | 12/2005 | Suzawa et al. | |
| 2008/0286891 | A1 | | 11/2008 | Suzawa et al. | |
| 2009/0040447 | A1 | | 2/2009 | Nakagawa | |
| 2013/0300968 | A1 | * | 11/2013 | Okajima | ........... G02F 1/136209 349/43 |
| 2017/0123250 | A1 | | 5/2017 | Wada et al. | |

FOREIGN PATENT DOCUMENTS

| JP | 2001-318625 A | 11/2001 |
| JP | 2005-250234 A | 9/2005 |
| JP | 2007-318151 A | 12/2007 |
| JP | 2008-225034 A | 9/2008 |
| JP | 2015-215622 A | 12/2015 |
| JP | 2017-083679 A | 5/2017 |

* cited by examiner

*Primary Examiner* — Dale E Page
*Assistant Examiner* — Quovaunda Jefferson
(74) *Attorney, Agent, or Firm* — Oliff PLC

(57) ABSTRACT

An electro-optical device includes a pixel electrode that is light-transmissive, a substrate that is light-transmissive and that is provided with a recessed portion open to the pixel electrode side, a light-shielding body disposed in the recessed portion, and a switching element overlapping, in a plan view from a thickness direction of the substrate, the light-shielding body, the switching element being electrically coupled to the pixel electrode, wherein the light-shielding body includes a metal film containing tungsten, and a metal nitride film that is disposed between the metal film and the substrate and that contains tungsten nitride.

12 Claims, 13 Drawing Sheets

ELECTRO-OPTICAL DEVICE AND ELECTRONIC APPARATUS

The present application is based on and claims priority from JP-A-2018-118642, filed on Jun. 22, 2018, the disclosure of which is hereby incorporated by reference herein in its entirety.

BACKGROUND

1. Technical Field

The present disclosure relates to an electro-optical device and an electronic apparatus.

2. Related Art

An electro-optical device such as a liquid crystal device is used in an electronic apparatus such as a projector. JP-A-2005-250234 discloses a liquid crystal device including an element substrate, a counter substrate, and liquid crystals disposed between these substrates. The element substrate included in this liquid crystal device includes a substrate made, for example, of quartz, a plurality of pixel electrodes arranged in a matrix manner to be spaced apart from the substrate, and a thin film transistor (TFT) provided to correspond to each of the pixel electrodes.

In addition, the element substrate described in JP-A-2005-250234 includes a light shielding film made, for example, of metal, in order to prevent light from entering the TFT. The light shielding film is embedded in a groove provided in a substrate to prevent light from irregularly reflecting on unevenness resulting from the thickness of the light shielding film.

However, the light shielding film described in JP-A-2005-250234 is made of metal material such as titanium, chromium, and tungsten, and is disposed directly on the substrate made of quartz or the like, and hence, the adhesive property with respect to the substrate is not sufficient. For this reason, in the case of the light shielding film having a typical configuration, the light shielding film may be peeled off from the substrate, for example, at the time of manufacturing. Thus, there has been a problem in that it is difficult to achieve an element substrate having a light shielding film that sufficiently prevents light from entering the TFT.

SUMMARY

One aspect of an electro-optical device according to the present disclosure includes a pixel electrode that is light-transmissive, a substrate that is light-transmissive and that is provided with a recessed portion open to the pixel electrode side, a light-shielding body disposed in the recessed portion, and a switching element overlapping, in a plan view from a thickness direction of the substrate, the light-shielding body, the switching element being electrically coupled to the pixel electrode, wherein the light-shielding body includes a metal film containing tungsten, and a metal nitride film that is disposed between the metal film and the substrate and that contains tungsten nitride.

One aspect of an electro-optical device according to the present disclosure includes a pixel electrode that is light-transmissive, a substrate that is light-transmissive and that is provided with a recessed portion open to the pixel electrode side, a light-shielding body disposed in the recessed portion, and a switching element overlapping, in a plan view from a thickness direction of the substrate, the light-shielding body, the switching element being electrically coupled to the pixel electrode, wherein the light-shielding body includes a metal film containing tungsten, and a metal nitride film that is disposed between the metal film and the substrate and that contains titanium nitride.

DESCRIPTION OF EXEMPLARY EMBODIMENTS

Figure 1:
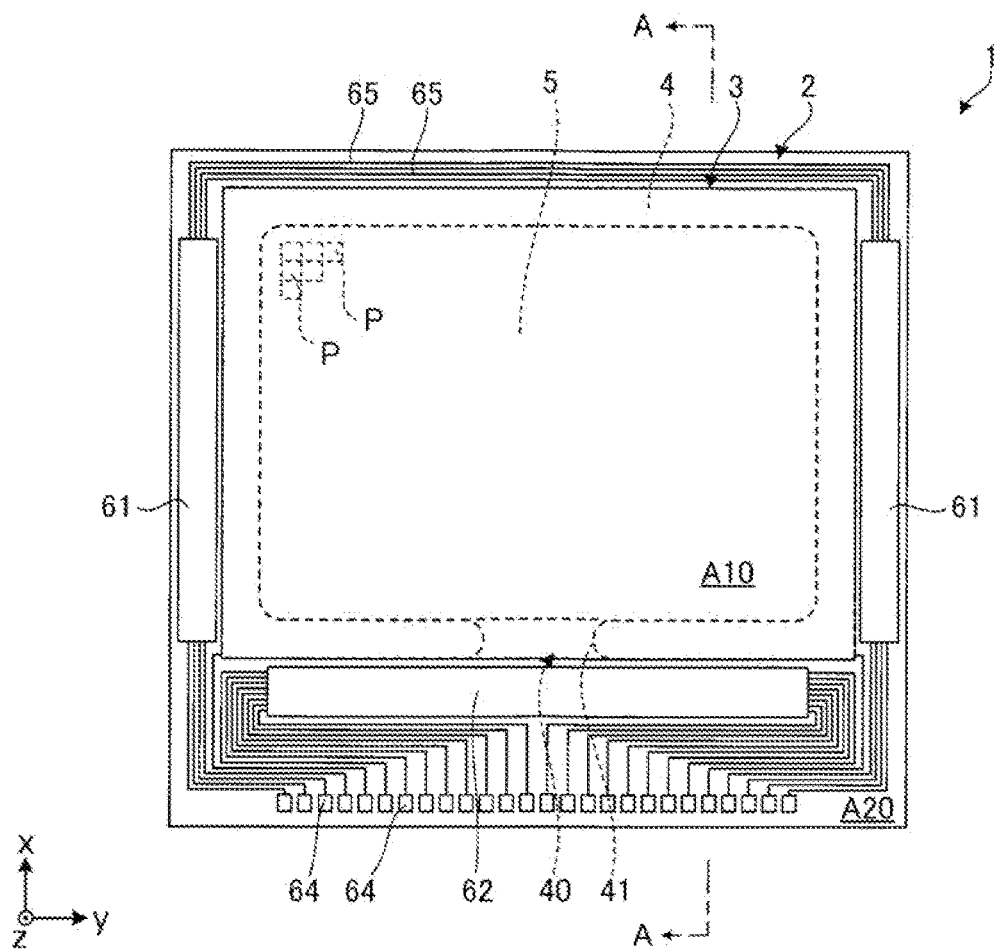
FIG. 1 is a plan view illustrating a liquid crystal device serving as one example of an electro-optical device according to a first exemplary embodiment.

Hereinafter, preferred exemplary embodiments of the present disclosure will be described with reference to the accompanying drawings. Note that, in the drawings, dimensions and scales of respective portions may be illustrated differently from actual dimensions and scales as appropriate, and some portions are schematically illustrated to facilitate understanding. In addition, the scope of the present disclosure is not limited to these exemplary embodiments unless otherwise stated to limit the present disclosure in the following descriptions. Note that, in the present specification, "parallel" does not only include a case where two planes or two lines are completely parallel to each other but also includes a case where one of two planes or two lines is angled relative to the other line within a range of ±5°.

1. Liquid Crystal Device

1-1. First Exemplary Embodiment

As one example of an electro-optical device according to the present disclosure, description will be made of, as an example, an active matrix liquid crystal device including a thin film transistor (TFT) serving as a switching element.

1-1a. Basic Configuration

Figure 2:
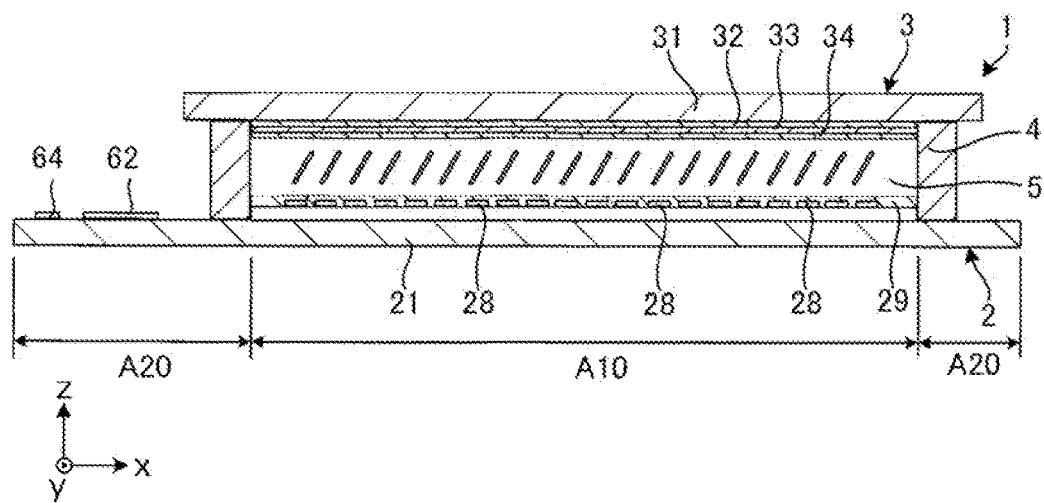
FIG. 2 is a cross-sectional view illustrating a liquid crystal device according to the first exemplary embodiment.

FIG. 1 is a plan view illustrating a liquid crystal device serving as one example of an electro-optical device according to a first exemplary embodiment. FIG. 2 is a cross-sectional view illustrating the liquid crystal device according to the first exemplary embodiment, and is a cross-sectional view taken along the line A-A in FIG. 1. Note that, hereinbelow, for the purpose of explanation, description will be made using the x axis, the y axis, and the z axis as appropriate, which are illustrated in FIGS. 1 and 2 and are perpendicular to each other.

The electro-optical device 1 illustrated in FIGS. 1 and 2 is a transmissive-type liquid crystal device. The electro-optical device 1 includes an element substrate 2 having a light-transmissive property, a counter substrate 3 having a light-transmissive property disposed to face the element substrate 2, a sealing member 4 having a frame shape disposed between the element substrate 2 and the counter substrate 3, and a liquid crystal layer 5 surrounded by the element substrate 2, the counter substrate 3, and the sealing member 4.

The light that passes through the electro-optical device 1 is a visible light. The light-transmissive property means a transmissive property concerning the visible light, and preferably means that the transmittance for the visible light is equal to or greater than 50%.

As illustrated in FIG. 1, the electro-optical device 1 forms a quadrilateral shape in a plan view when viewed from the z-axis direction parallel to the thickness direction of the element substrate 2. However, the shape of the electro-optical device 1 in a plan view is not limited to this. The electro-optical device 1 may form, for example, a circular shape or the like. In addition, hereinbelow, the plan view when viewed from the z-axis direction parallel to the thickness direction of the element substrate 2 is simply referred to as "plan view". Note that, in the present exemplary embodiment, the z-axis direction is parallel to the optical axis of light.

As illustrated in FIG. 1, the element substrate 2 has a size encompassing the counter substrate 3 in a plan view. As illustrated in FIG. 2, the element substrate 2 includes a substrate 21, a plurality of pixel electrodes 28, and an alignment film 29. The substrate 21 is configured using a flat plate having a light-transmissive property and an insulating property. The pixel electrodes 28 are made of a transparent conductive material such as indium tin oxide (ITO) and indium zinc oxide (IZO), for example. The alignment film 29 of the element substrate 2 is located closest to the liquid crystal layer 5, and aligns liquid crystal molecules of the liquid crystal layer 5. The constituent material of the alignment film 29 includes, for example, polyimide and silicon oxide.

Furthermore, a TFT 25, a light-shielding body 22, and the like are disposed between the substrate 21 and the pixel electrodes 28, although not illustrated in FIG. 1 or FIG. 2. The TFT 25, the light-shielding body 22, and the like will be described later with reference to FIG. 5 and the like.

As illustrated in FIG. 2, the counter substrate 3 includes a counter-substrate substrate 31, an insulating layer 32, a common electrode 33, and an alignment film 34. The counter-substrate substrate 31, the insulating layer 32, the common electrode 33, and the alignment film 34 are arranged in this order. Of these, the alignment film 34 is located closest to the liquid crystal layer 5.

The counter-substrate substrate 31 is configured using a flat plate having a light-transmissive property and an insulating property. The counter-substrate substrate 31 is made, for example, of glass, quartz, or the like. The common electrode 33 is laminated on the counter-substrate substrate 31 via the insulating layer 32 formed using an insulating material having a light-transmissive property. The common electrode 33 is made of a transparent and electrically conductive material such as ITO and IZO, for example. In addition, the alignment film 34 aligns the liquid crystal molecules of the liquid crystal layer 5. The constituent material of the alignment film 34 include, for example, polyimide, silicon oxide, and the like.

The sealing member 4 is formed using an adhesive or the like containing various types of curable resins such as epoxy resin, for example. The sealing member 4 is affixed to each of the element substrate 2 and the counter substrate 3. The liquid crystal layer 5 is disposed in an area surrounded by the sealing member 4, the element substrate 2, and the counter substrate 3. Note that an injection port 41 for injecting a liquid crystal material containing liquid crystal molecules is formed in a portion of the sealing member 4, and the injection port 41 is sealed using a sealing member 40 formed using various types of resin materials.

The liquid crystal layer 5 contains liquid crystal molecules having positive or negative dielectric anisotropy. The liquid crystal layer 5 is interposed between the element substrate 2 and the counter substrate 3 such that the liquid crystal molecules are in contact with both the alignment film 29 and the alignment film 34. The alignment of the liquid crystal molecules changes according to voltage applied to the liquid crystal layer 5. The liquid crystal layer 5 modulates the light according to voltage applied, enabling gray-scale display to be performed.

Furthermore, as illustrated in FIG. 1, two scanning-line driving circuits 61 and one signal-line driving circuit 62 are disposed on a surface of the element substrate 2 on the counter substrate 3 side. In addition, a plurality of external terminals 64 are disposed on the surface of the element substrate 2 on the counter substrate 3 side. The external terminals 64 are coupled to wiring lines 65 guided from each of the scanning-line driving circuits 61 and the signal-line driving circuit 62.

The electro-optical device 1 includes a display region A10 that overlaps with the liquid crystal layer 5 in a plan view and displays images or the like, and also includes a peripheral region A20 that surrounds the display region A10 in a plan view. The display region A10 includes a plurality of pixels P arranged in a matrix pattern. One pixel electrode 28 is disposed on each of the pixels P. The scanning-line driving circuits 61, the signal-line driving circuit 62, and the like, which are described above, are disposed in the peripheral region A20.

Furthermore, the driving scheme of the electro-optical device 1 may include, but is not limited to, a twisted nematic (TN) mode and a vertical alignment (VA) mode, for example.

1-1b. Electrical Configuration

Figure 3:
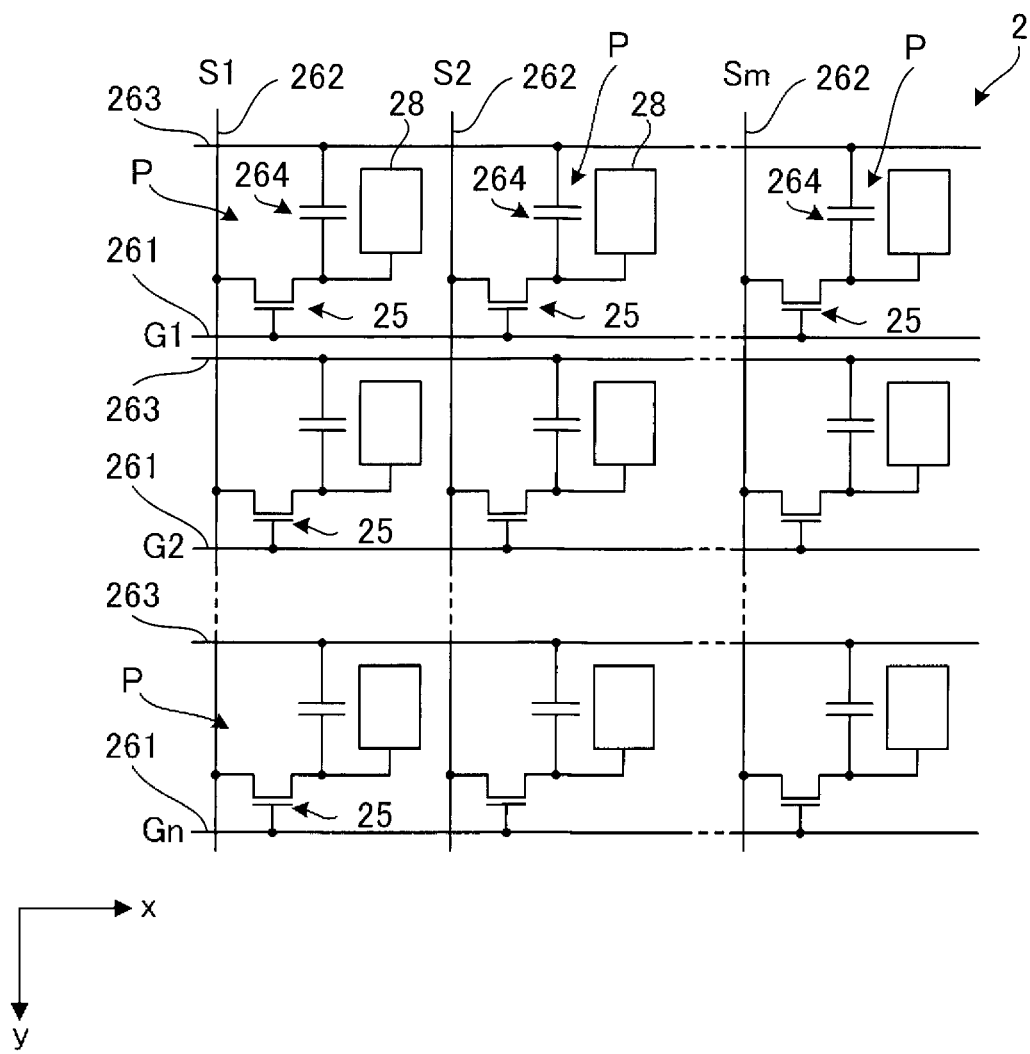
FIG. 3 is an equivalent circuit diagram illustrating an electrical configuration of an element substrate according to the first exemplary embodiment.

FIG. 3 is an equivalent circuit diagram illustrating an electrical configuration of the element substrate according to the first exemplary embodiment. As illustrated in FIG. 3, n pieces of scanning lines 261, m pieces of signal lines 262, and n pieces of capacitance lines 263 are formed on the element substrate 2. Note that both n and m are integers of 2 or greater. The TFT 25 is disposed to correspond to respective intersections between the n pieces of scanning lines 261 and the m pieces of signal lines 262.

The n pieces of scanning lines 261 illustrated in FIG. 3 are arranged at equal intervals in the y-axis direction and extend in the x-axis direction. The scanning line 261 is electrically coupled to the TFT 25. In addition, the n pieces of scanning lines 261 are electrically coupled to the scanning-line driving circuit 61 illustrated in FIG. 1. On the n pieces of scanning lines 261, scanning signals G1, G2, . . . , and Gn are line-sequentially supplied from the scanning-line driving circuit 61 to the scanning lines 261.

The m pieces of signal lines 262 illustrated in FIG. 3 are arranged at equal intervals in the x-axis direction and extend in the y-axis direction. The signal line 262 is electrically coupled to the TFT 25. The m pieces of signal lines 262 are electrically coupled to the signal-line driving circuit 62 illustrated in FIG. 1. On the m pieces of signal lines 262, image signals S1, S2, . . . , and Sm are line-sequentially supplied from the signal-line driving circuit 62 illustrated in FIG. 1 to the signal lines 262.

The n pieces of scanning lines 261 and the m pieces of signal lines 262 are insulated from each other, and are formed in a lattice pattern in a plan view. An area surrounded by two adjacent scanning lines 261 and two adjacent signal lines 262 corresponds to the pixel P. One pixel electrode 28 is formed on each of the pixels P. Note that the pixel electrode 28 is electrically coupled to the TFT 25.

The n pieces of capacitance lines 263 are arranged at equal intervals in the y-axis direction, and extend in the x-axis direction. In addition, the n pieces of capacitance lines 263 are insulated from the plurality of signal lines 262 and the plurality of scanning lines 261, and are formed to be spaced apart from these lines. A fixed potential such as a ground potential is applied to the capacitance lines 263. Furthermore, a storage capacitor 264 is disposed between the capacitance line 263 and the pixel electrode 28 to be in parallel to a liquid crystal capacitor, to prevent leakage of charges held in the liquid crystal capacitor.

The scanning signals G1, G2, . . . , and Gn become sequentially active, and n pieces of scanning lines 261 are sequentially selected. Then, the TFT 25 coupled to the selected scanning line 261 is turned into the "ON" state. After this, image signals S1, S2, . . . , and Sm having the magnitude corresponding to a grayscale to be displayed are transmitted, through the m pieces of signal lines 262, into the pixel P corresponding to the selected scanning line 261, and are then applied to the pixel electrodes 28. This allows a voltage corresponding to the grayscale to be displayed, to be applied to the liquid crystal capacitor formed between the pixel electrode 28 and the common electrode 33 of the counter substrate 3 illustrated in FIG. 2, and the alignment of the liquid crystal molecules changes according to the applied voltage. The applied voltage is held by the storage capacitor 264. Such a change of the alignment of the liquid crystal molecules causes the light to be modulated, thereby enabling grayscale display.

1-1c. Configuration of Element Substrate in Display Region

Figure 4:
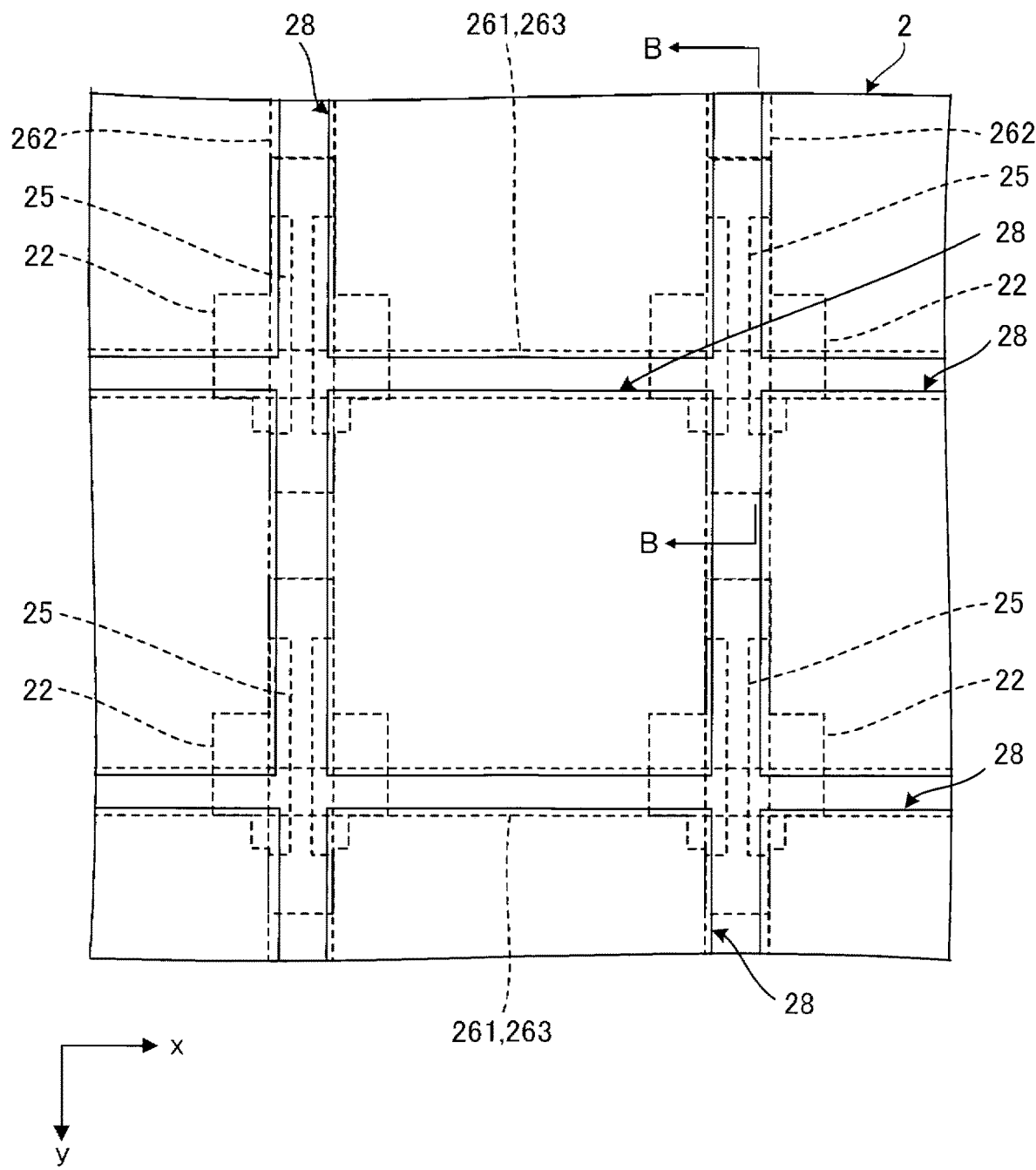
FIG. 4 is a partial plan view illustrating the element substrate according to the first exemplary embodiment.
Figure 5:
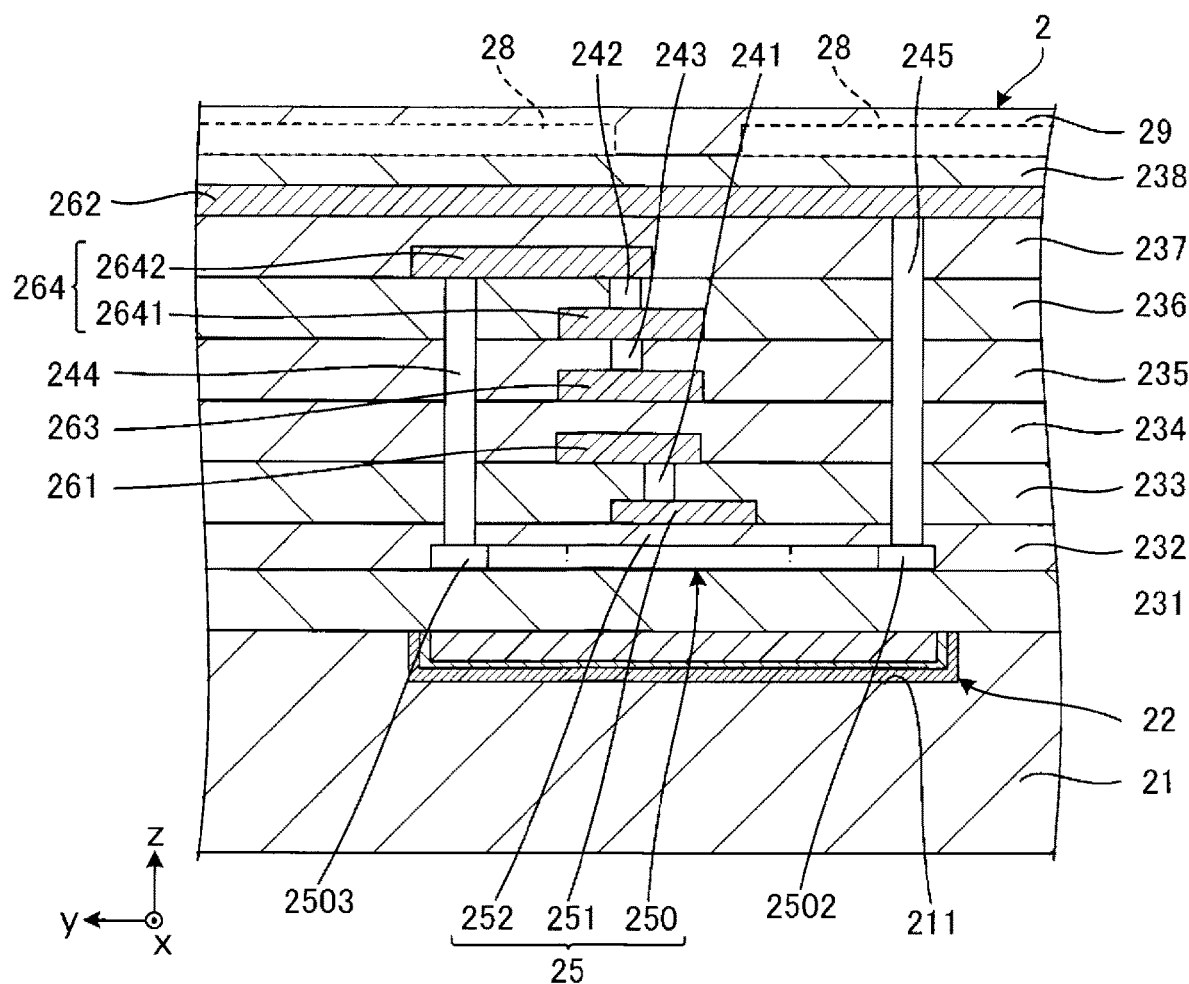
FIG. 5 is a partial cross-sectional view illustrating the element substrate according to the first exemplary embodiment.

Next, description will be made of a detailed configuration of a portion of the display region A10 of the element substrate 2 illustrated in FIG. 2. FIG. 4 is a partial plan view illustrating the element substrate according to the first exemplary embodiment. FIG. 5 is a partial cross-sectional view illustrating the element substrate according to the first exemplary embodiment, and is a cross-sectional view taken along the B-B line in FIG. 4.

The element substrate 2 illustrated in FIGS. 4 and 5 includes a substrate 21, a plurality of light shielding bodies 22, a plurality of TFTs 25, a plurality of scanning lines 261, a plurality of signal lines 262, a plurality of capacitance lines 263, a plurality of storage capacitor 264, a plurality of pixel electrodes 28, and an alignment film 29. Note that, in FIG. 4, illustration of the storage capacitors 264 and the alignment film 29 is not given. Below, each portion of the element substrate 2 will be sequentially described.

As illustrated in FIG. 5, the substrate 21 is a flat plate provided with a recessed portion 211 opened toward the pixel electrode 28 side. The constituent material of the substrate 21 includes, for example, a silicon-based inorganic compound. More specifically, the substrate 21 is made, for example, of glass or quartz.

Figure 6:
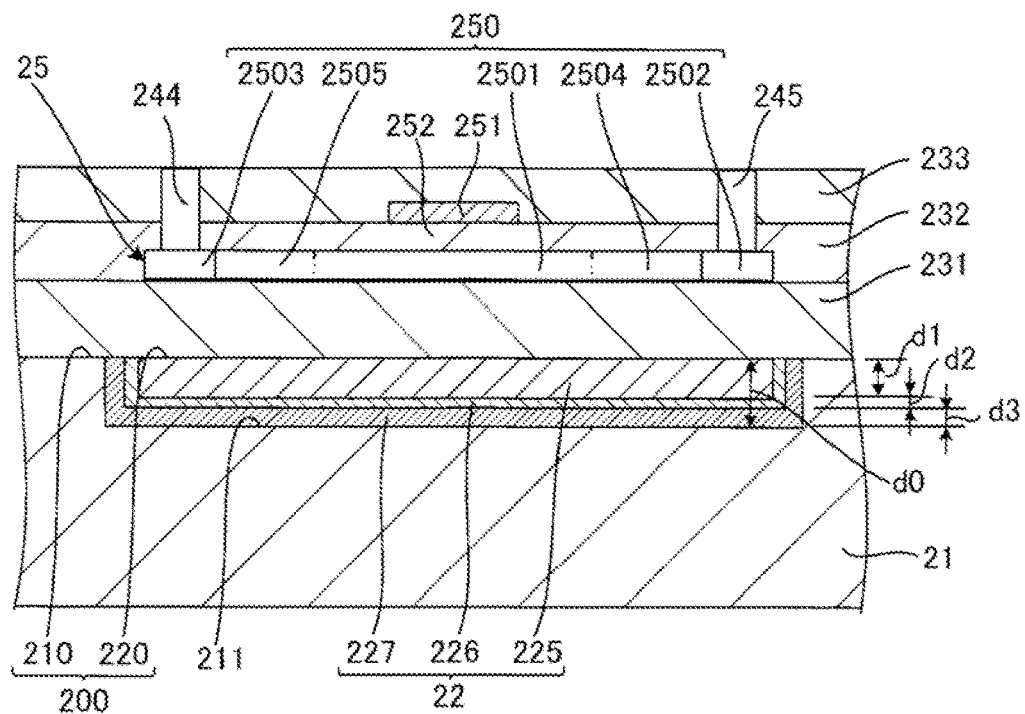
FIG. 6 is a cross-sectional view illustrating a light-shielding body included in the element substrate according to the first exemplary embodiment.
Figure 7:
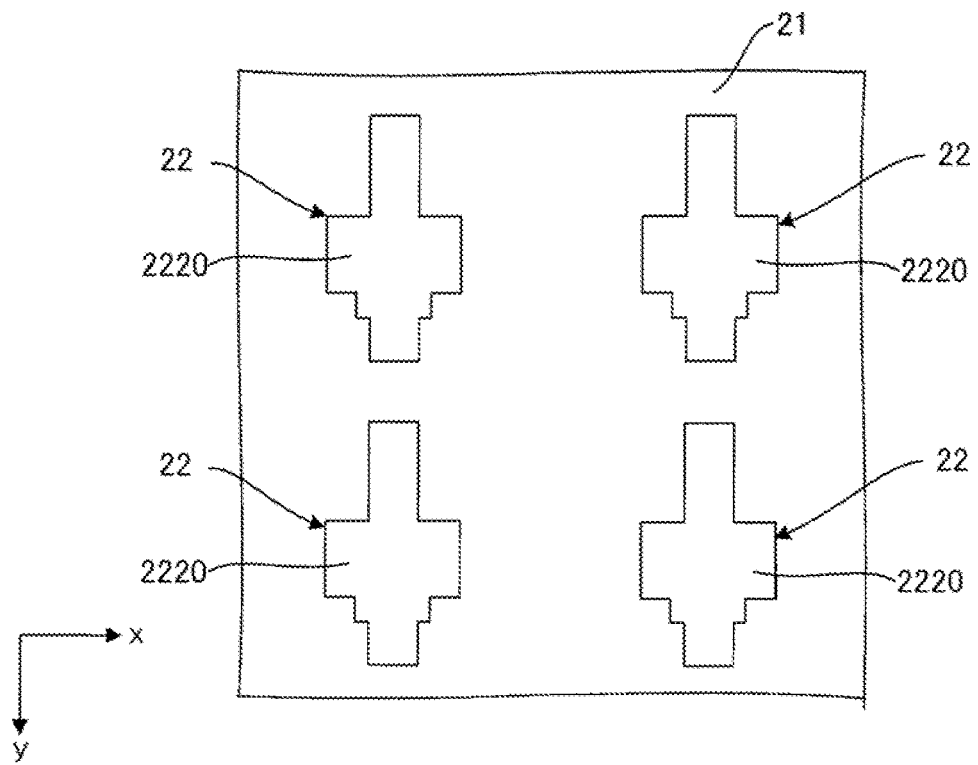
FIG. 7 is a plan view illustrating the light-shielding body included in the element substrate according to the first exemplary embodiment.

FIG. 6 is a cross-sectional view illustrating a light-shielding body included in the element substrate according to the first exemplary embodiment. FIG. 7 is a plan view illustrating the light-shielding body included in the element substrate according to the first exemplary embodiment.

As illustrated in FIG. 6, the light-shielding body 22 is embedded in the recessed portion 211 of the substrate 21. The light-shielding body 22 has a light shielding property and electrical conductivity. Note that, in the present specification, the light shielding property means a light shielding property for visible light, and specifically means that the transmittance for visible light is equal to or less than 10%, and preferably, is equal to or less than 5%.

As illustrated in FIG. 7, the plurality of light shielding bodies 22 are disposed in a matrix pattern in a plan view. In the drawing, the light-shielding body 22, which has a shape extending in the y-axis direction in a plan view, includes a widened portion 2220 provided at the middle point of the light-shielding body 22 in the +y-axis direction. The widened portion 2220 has a width wider than the widths at both ends of the light-shielding body 22 in a plan view. Note that the angle formed by individual sides constituting the outer shape of the light-shielding body 22 is 90 degrees. However, the corners of the light-shielding body 22 may be rounded. Furthermore, the thickness d0 of the light-shielding body 22 is constant as illustrated in FIG. 6. In addition, a surface 220 of the light-shielding body 22 on the +z-axis side is located on the same plane as a surface 210 of the substrate 21 on the +z-axis side. The surface 210 and the surface 220 form the planar surface 200.

Furthermore, the light-shielding body 22 includes a metal film 225, a metal nitride film 226 disposed between the metal film 225 and the substrate 21, and a tungsten silicide film 227 disposed between the metal nitride film 226 and the substrate 21. The metal film 225 contains tungsten. The metal nitride film 226 contains tungsten nitride (WN) or titanium nitride (TiN). The tungsten silicide film 227 contains tungsten silicide. Note that the metal film 225 may contain, for example, approximately 5% of other metal other than the metals described above. Furthermore, the metal nitride film 226 and the tungsten silicide film 227 may each contain, for example, approximately 5% of other material other than the materials described above. In addition, the metal nitride film 226 may have a configuration containing both tungsten nitride and titanium nitride, or may have a layered structure including a metal nitride film containing tungsten nitride and a metal nitride film containing titanium nitride.

Here, of various types of metal, tungsten has an excellent thermal resistance property, and is less likely to reduce the optical density (OD) value due to thermal treatment, for example, at the time of manufacturing. Thus, as the metal film 225 contains tungsten, it is possible to enhance the light shielding property of the light-shielding body 22.

Furthermore, with the light-shielding body 22 including the metal nitride film 226 and the tungsten silicide film 227, it is possible to enhance an adhesive property between the substrate 21 and the light-shielding body 22, as compared when the metal nitride film 226 or the tungsten silicide film 227 is not provided. In particular, the tungsten silicide film 227 contains silicon atom, and hence, exhibits an excellent adhesive property with the substrate 21 made of silicon-based inorganic compound. Thus, with the tungsten silicide film 227 being provided, it is possible to particularly enhance the adhesive property between the light-shielding body 22 and the substrate 21.

Furthermore, in the case of tungsten silicide, the OD value is more likely to reduce due to thermal treatment, as compared with tungsten. Thus, when the tungsten silicide film 227 and the metal film 225 are in direct contact with each other, the OD value of the metal film 225 may reduce due to an effect of tungsten silicide. In the case of the light-shielding body 22, the metal nitride film 226 is disposed between the tungsten silicide film 227 and the metal film 225, and hence, it is possible to prevent the OD value of the metal film 225 from reducing due to the effect of tungsten silicide. In other words, the metal nitride film 226 functions as a barrier layer that prevents tungsten silicide contained in the tungsten silicide film 227 from diffusing into the metal film 225.

Furthermore, the thickness d3 of the tungsten silicide is thicker than the thickness d2 of the metal nitride film 226, and is thinner than the thickness d1 of the metal film 225. Since the thickness d1 is the thickest, it is possible to enhance the light shielding property of the light-shielding body 22. In addition, even if the thickness d2 is thinner than the thickness d3, the metal nitride film 226 can function as the barrier layer described above. Moreover, the tungsten silicide film 227 especially exhibits excellent adhesive property with respect to the substrate 21, and hence, due to the thickness d3 being thicker than the thickness d2, it is possible to enhance the adhesive property of the light-shielding body 22 with respect to the substrate 21 while suppressing the entire thickness d0 of the light-shielding body 22, as compared when the thickness d3 is thinner than the thickness d2. For this reason, it is possible to enhance the light shielding property of the light-shielding body 22 while suppressing the entire thickness d0 of the light-shielding body 22, and it is also possible to enhance the adhesive property between the substrate 21 and the light-shielding body 22. Furthermore, it is preferable that the thickness d1 is greater than the sum of the thickness d2 and the thickness d3. Since the thickness d1 is greater than this sum, it is possible to particularly increase the light shielding property of the light-shielding body 22. Note that the relationship of the thicknesses d1, d2, and d3 in terms of size is not limited to the relationship described above.

It is preferable that the thickness d1 is not less than 10 nm and not greater than 500 nm. It is preferable that the thickness d2 is not less than 0.1 nm and not greater than 50 nm. It is preferable that the thickness d3 is not less than 1 nm and not greater than 100 nm. With the thicknesses d1, d2, and d3 falling in the ranges described above, it is possible to particularly significantly achieve the effect of enhancing the adhesive property of the light-shielding body 22 and enhancing the light shielding property of the light-shielding body 22 while suppressing the entire thickness d0 of the light-shielding body 22.

As illustrated in FIG. 6, a first interlayer insulating layer 231 is disposed on the planar surface 200. The TFT 25 is disposed on the first interlayer insulating layer 231. One TFT 25 is disposed to form a pair with one light-shielding body 22 described above. The TFT 25 includes a semiconductor layer 250, a gate electrode 251, and a gate insulating film 252. The semiconductor layer 250 is disposed on the first interlayer insulating layer 231. In addition, the gate insulating film 252 is interposed between the semiconductor layer 250 and the gate electrode 251.

The semiconductor layer 250 includes a channel region 2501, a source region 2502, a drain region 2503, a first LDD region 2504, and a second LDD region 2505. The source region 2502 functions as a "source electrode". The drain region 2503 functions as a "drain electrode". The channel region 2501 is located between the source region 2502 and the drain region 2503. The channel region 2501 overlaps with the gate electrode 251 in a plan view. The first LDD region 2504 is located between the channel region 2501 and the source region 2502. The second LDD region 2505 is located between the channel region 2501 and the drain region 2503. Note that at least one of the first LDD region 2504 and the second LDD region 2505, in particular, the first LDD region 2504 may be omitted.

This semiconductor layer 250 is formed, for example, by forming polysilicon into a film. Impurities for enhancing an electrical conductivity are doped in a region of the semiconductor layer 250 except for the channel region 2501. The concentrations of the impurities in the first LDD region 2504 and the second LDD region 2505 are lower than the concentrations of the impurities in the source region 2502 and the drain region 2503.

Figure 8:
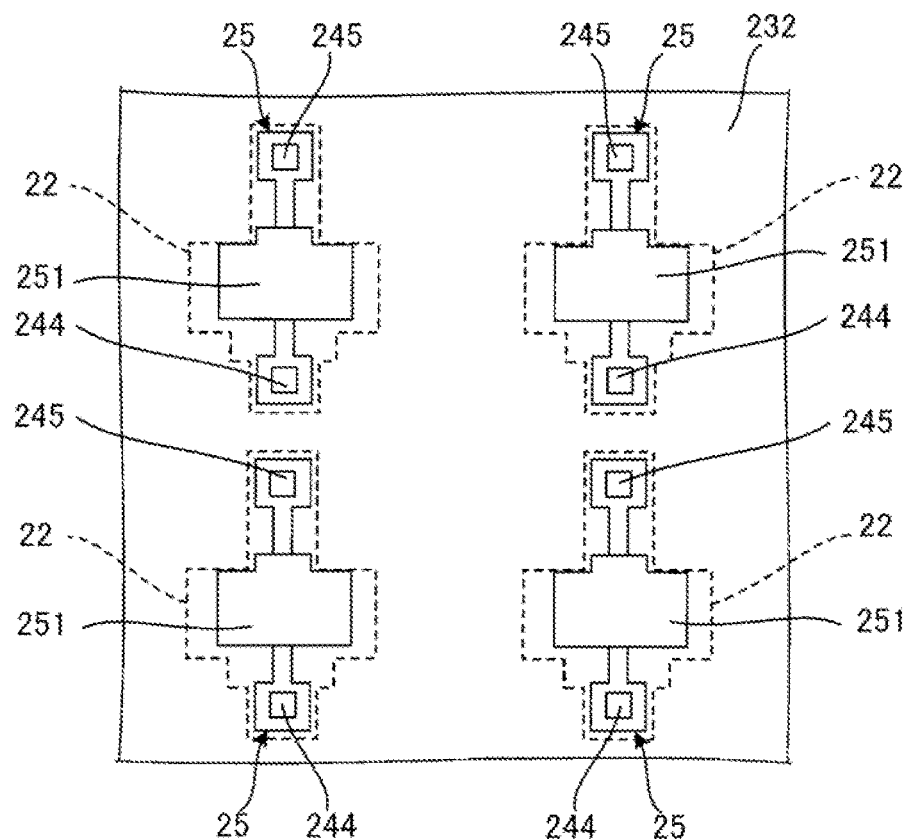
FIG. 8 is a plan view illustrating a TFT included in the element substrate according to the first exemplary embodiment.

FIG. 8 is a plan view illustrating a TFT included in the element substrate according to the first exemplary embodiment. As illustrated in FIG. 8, the semiconductor layer 250 of the TFT 25 has a longitudinal shape along the +y-axis direction in a plan view, and the longitudinal direction of the semiconductor layer 250 is in parallel to the longitudinal direction of the light-shielding body 22. In addition, the TFT 25 overlaps with the light-shielding body 22 in a plan view. As the TFT 25 and the light-shielding body 22 overlap with each other in a plan view, the light-shielding body 22 blocks light, and hence, entrance of light into the TFT 25 can be prevented or be reduced.

Note that the gate electrode 251 and the light-shielding body 22 described above may be electrically coupled to each other. In this case, the light-shielding body 22 can be used as a back gate. In addition, in this case, although illustration is not given, a contact that electrically couples the gate electrode 251 and the light-shielding body 22 can be formed between the gate electrode 251 and the widened portion 2220 to overlap with the gate electrode 251 and the widened portion 2220 in a plan view.

As illustrated in FIG. 5, a second interlayer insulating layer 232 is disposed on the semiconductor layer 250, and a third interlayer insulating layer 233 is disposed on the second interlayer insulating layer 232 to cover the gate electrode 251. Furthermore, the scanning line 261 is disposed on the third interlayer insulating layer 233. In addition, a contact hole is provided in the third interlayer insulating layer 233, and a contacting portion 241 for electrically coupling the scanning line 261 and the gate electrode 251 is disposed in the contact hole.

A fourth interlayer insulating layer 234 is disposed on the third interlayer insulating layer 233 to cover the scanning line 261. The capacitance line 263 is disposed on the fourth interlayer insulating layer 234.

A fifth interlayer insulating layer 235 is disposed on the fourth interlayer insulating layer 234 to cover the capacitance line 263. The storage capacitor 264 includes a first capacitor 2641 and a second capacitor 2642.

The first capacitor 2641 is disposed on the fifth interlayer insulating layer 235. A sixth interlayer insulating layer 236 is disposed on the fifth interlayer insulating layer 235 to cover the first capacitor 2641. A second capacitor 2642 is disposed on the sixth interlayer insulating layer 236. A contact hole is provided in the sixth interlayer insulating layer 236, and a contacting portion 242 for electrically coupling the first capacitor 2641 and the second capacitor 2642 is disposed in this contact hole. Although detailed illustration is not given, the first capacitor 2641 and the second capacitor 2642 each include two capacitance electrodes, and a dielectric disposed between these capacitance electrodes.

Furthermore, a contact hole is provided in the fifth interlayer insulating layer 235, and a contacting portion 243 for electrically coupling the first capacitor 2641 and the capacitance line 263 is disposed in this contact hole. A contact hole is provided in the second to six interlayer insulating layers 232 to 236, and a contacting portion 244 for electrically coupling the second capacitor 2642 and the drain region 2503 is disposed in this contact hole. In addition, the drain region 2503 is electrically coupled to the pixel electrode 28 via the contacting portion 244, the storage capacitor 264, a not-illustrated contact, and the like.

A seventh interlayer insulating layer 237 is disposed on the sixth interlayer insulating layer 236 to cover the second capacitor 2642. The signal line 262 is disposed on the seventh interlayer insulating layer 237. In addition, an intersecting portion where the signal line 262 and the scanning line 261 intersect each other in a plan view overlaps with the TFT 25 as illustrated in FIG. 5. Furthermore, as illustrated in FIG. 6, a contact hole is provided in the second to seventh interlayer insulating layers 232 to 237, and a contacting portion 245 for electrically coupling the signal line 262 and the source region 2502 is disposed in this contact hole.

An eighth interlayer insulating layer 238 is disposed on the seventh interlayer insulating layer 237 to cover the signal line 262. The pixel electrode 28 is disposed on the eighth interlayer insulating layer 238. One pixel electrode 28 and one TFT 25 described above form a pair. In addition, the alignment film 29 is disposed on the pixel electrode 28.

The first to eighth interlayer insulating layers 231 to 238 described above are formed using, for example, silicon-based inorganic compound, and more specifically, is made, for example, of silicon thermal oxide layer or silicon oxide film formed through a vapor deposition method such as a chemical vapor deposition (CVD) method. Furthermore, the constituent material of the capacitance electrode included in each of the scanning line 261, the signal line 262, the capacitance line 263, and the storage capacitor 264 includes, for example, material having electrical conductivity such as polysilicon, metal, metal silicide, and metal compound. In addition, the constituent material of each of the contacting portions 241 to 245 described above is formed using material having electrical conductivity.

These are descriptions of the configuration of the element substrate 2 in the display region A10. As described above, there are provided the pixel electrode 28 having light-transmissive property, the substrate 21 having light-transmissive property provided with the recessed portion 211 opened toward the pixel electrode 28 side, the light-shielding body 22 disposed in the recessed portion 211, and the TFT 25 overlapping with the light-shielding body 22 in a plan view and electrically coupled to the pixel electrode 28. The TFT 25 is one example of the "switching element". In addition, the light-shielding body 22 includes the metal film 225 containing tungsten, and also includes the metal nitride film 226 located between the metal film 225 and the substrate 21 and containing tungsten nitride or titanium nitride.

In the case of the element substrate 2, as the light-shielding body 22 includes the metal nitride film 226, it is possible to enhance an adhesive property between the substrate 21 and the light-shielding body 22, as compared when the metal nitride film 226 is not provided. Thus, it is possible to reduce the possibility of peeling off of the light-shielding body 22 from the substrate 21. In addition, with the element substrate 2 being provided with the metal film 225 containing tungsten, it is possible to enhance the light shielding property of the light-shielding body 22. With the light-shielding body 22 described above, the light-shielding body 22 is less likely to peel off from the substrate 21, and hence, it is possible to obtain the element substrate 2 exhibiting excellent light shielding property. Thus, the light-shielding body 22 favorably reduces the light entering the TFT 25 or prevents the light from entering the TFT 25, and hence, it is possible to reduce or prevent occurrence of malfunction of the TFT 25 due to leakage current. This makes it possible to improve quality of the electro-optical device 1.

Furthermore, as described above, the light-shielding body 22 includes the tungsten silicide film 227 located between the metal nitride film 226 and the substrate 21 and containing tungsten silicide.

With the light-shielding body 22 including the tungsten silicide film 227, it is possible to enhance the adhesive property between the light-shielding body 22 and the substrate 21, as compared when the tungsten silicide film 227 is not provided. In addition, as described above, in the case where the light-shielding body 22 includes the tungsten silicide film 227, the metal nitride film 226 functions as the barrier layer, and hence, it is possible to prevent a reduction in the OD value of the metal film 225. Thus, as the light-shielding body 22 includes the tungsten silicide film 227, it is possible to form the light-shielding body 22 that is less likely to peel off from the substrate 21 and has a higher OD value.

Furthermore, as the metal nitride film 226 and the tungsten silicide film 227 are disposed across the entire area between the substrate 21 and the metal film 225 as illustrated in FIG. 6, it is possible to further increase the adhesive property between the substrate 21 and the light-shielding body 22. Note that the metal nitride film 226 and the tungsten silicide film 227 may be each disposed in a portion of the area between the substrate 21 and the metal film 225. However, to enhance the effect described above, it is preferable that the metal nitride film 226 be interposed in the widest possible area between the metal film 225 and the tungsten silicide film 227.

Furthermore, the thickness d3 of the tungsten silicide film 227 is thicker than the thickness d2 of the metal nitride film 226, and is thinner than the thickness d1 of the metal film 225, as described above. As the thicknesses d1, d2, and d3 have the relationships described above, it is possible to enhance the light shielding property of the light-shielding body 22 while suppressing the entire thickness d0 of the light-shielding body 22, and it is also possible to enhance the adhesive property between the substrate 21 and the light-shielding body 22, as described above.

Note that the relationships of the thicknesses d1, d2, and d3 are not limited to the relationships described above. For example, the thickness d2 may be thicker than the thickness d1. In addition, the thicknesses d1, d2, and d3 each have the equivalent value.

Furthermore, as described above, the planar surface 200 is configured by the surface 210 of the substrate 21 on the pixel electrode 28 side and the surface 220 of the light-shielding body 22 on the pixel electrode 28 side. With the planar surface 200 being configured, there is no step between the surface 210 and the surface 220, and hence, light does not irregularly reflect at the step. This also makes it possible to reduce a possibility that light enters the TFT 25.

Note that a step may exist between the surface 210 and the surface 220.

Furthermore, as described above, while the light-shielding body 22 overlaps with the TFT 25 to contain the entire TFT 25 in a plan view, the light-shielding body 22 may overlap only with part of the TFT 25. In this case, it is preferable that the light-shielding body 22 overlaps with the channel region 2501, the first LDD region 2504, and the second LDD region 2505 in a plan view. Here, when light enters the channel region 2501, the first LDD region 2504, and the second LDD region 2505, malfunction of the TFT 25 is more likely to occur due to leakage current. Thus, it can be said that the channel region 2501, the first LDD region 2504, and the second LDD region 2505 are portions that particularly need the light shielding property. For this reason, by configuring the second portion 222 to overlap with the channel region 2501, the first LDD region 2504, and the second LDD region 2505 in a plan view, it is possible to particularly effectively prevent malfunction of the TFT 25 due to leakage current. Note that the malfunction of the TFT 25 resulting from leakage current due to light is more likely to occur in the order of: the second LDD region 2505, the channel region 2501, and the first LDD region 2504.

Note that, the present exemplary embodiment employs an example in which the source region 2502 functions as a "source electrode". However, the "source electrode" may be regarded as a portion of the contacting portion 245 which is in contact with the source region 2502 and overlaps with the source region 2502. Similarly, the present exemplary embodiment employs an example in which the drain region 2503 functions as a "drain electrode". However, a portion of the contacting portion 244 which is in contact with the drain region 2503 and overlaps with the drain region 2503 may be regarded as the "drain electrode".

1-1d. Configuration of Element Substrate in Peripheral Region

Figure 9:
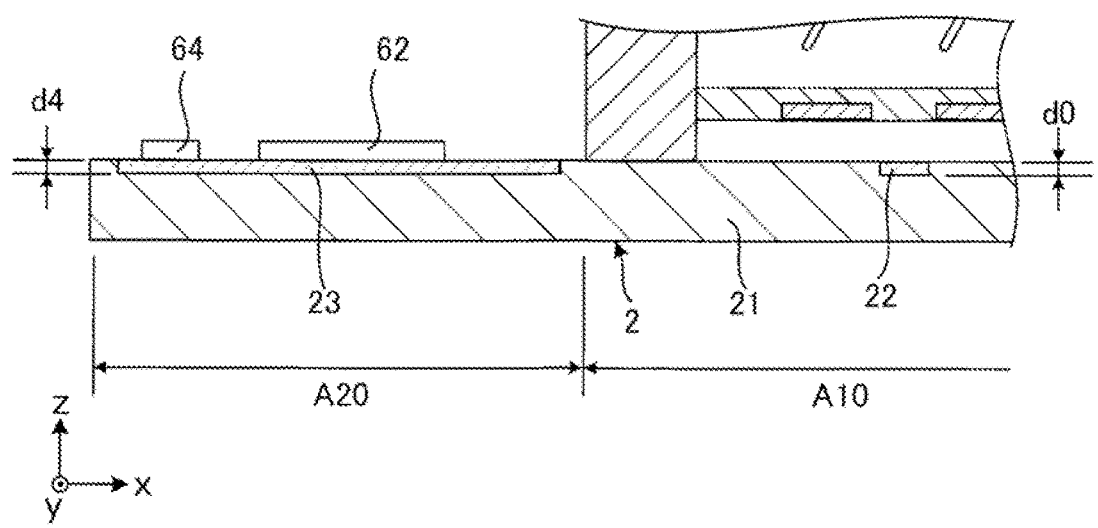
FIG. 9 is a cross-sectional view illustrating a circuit light-shielding body included in the element substrate in the first exemplary embodiment.

Next, a detailed configuration of a portion of the peripheral region A20 of the element substrate 2 illustrated in FIG. 2 will be described. FIG. 9 is a cross-sectional view illustrating a circuit light-shielding body included in the element substrate according to the first exemplary embodiment.

As illustrated in FIG. 9, the element substrate 2 includes a circuit light-shielding body 27 disposed in the peripheral region A20. The circuit light-shielding body 27 is embedded in a recessed portion 215 opened toward the +z-axis direction of the element substrate 2. A surface 270 of the circuit light-shielding body 27 on the +z-axis side is located on the same plane as the surface 220 of the substrate 21 on the +z-axis side.

The circuit light-shielding body 27 is disposed across almost the entire area of the peripheral region A20 illustrated in FIGS. 1 and 2. Thus, the circuit light-shielding body 27 overlaps with the scanning-line driving circuit 61, the signal-line driving circuit 62, the external terminal 64, and the wiring line 65 in a plan view. In addition, the thickness d4 of the circuit light-shielding body 27 is equal to the thickness d0 of the entire light-shielding body 22 described above.

With the circuit light-shielding body 27 being provided, it is possible to shield, from light, the scanning-line driving circuit 61, the signal-line driving circuit 62, the external terminal 64, and the wiring line 65 respectively. Thus, it is possible to particularly effectively prevent malfunction due to leakage current resulting from light entering the scanning-line driving circuit 61 or the like.

1-1e. Method for Manufacturing Element Substrate

Figure 10:
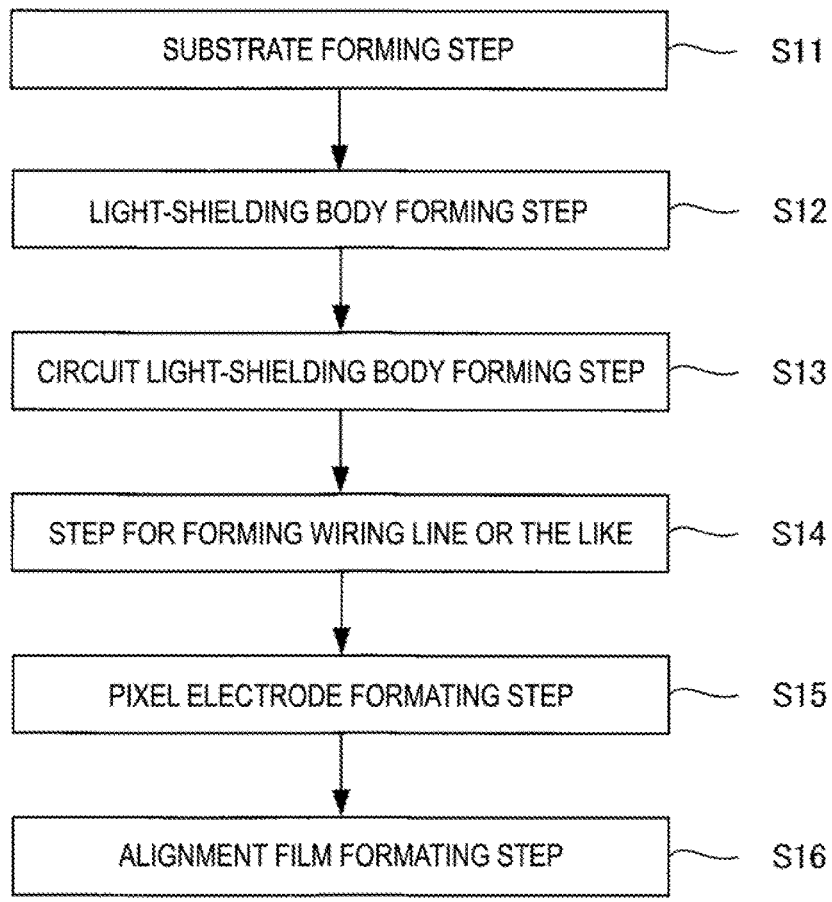
FIG. 10 is a flowchart illustrating a method for manufacturing the element substrate according to the first exemplary embodiment.

Next, a method for manufacturing the element substrate 2 will be described. FIG. 10 is a flowchart illustrating a method for manufacturing the element substrate according to the first exemplary embodiment.

The method for manufacturing the element substrate 2 includes a substrate forming step S11, a light-shielding body forming step S12, a circuit light-shielding body forming step S13, a step S14 for forming a wiring line or the like, a pixel-electrode forming step S15, and an alignment-film forming step S16. These steps are performed sequentially to manufacture the element substrate 2. Note that the light-shielding body forming step S12 and the circuit light-shielding body forming step S13 may be performed concurrently or in parallel, and the light-shielding body forming step S12 may be performed after the circuit light-shielding body forming step S13.

Figure 11:
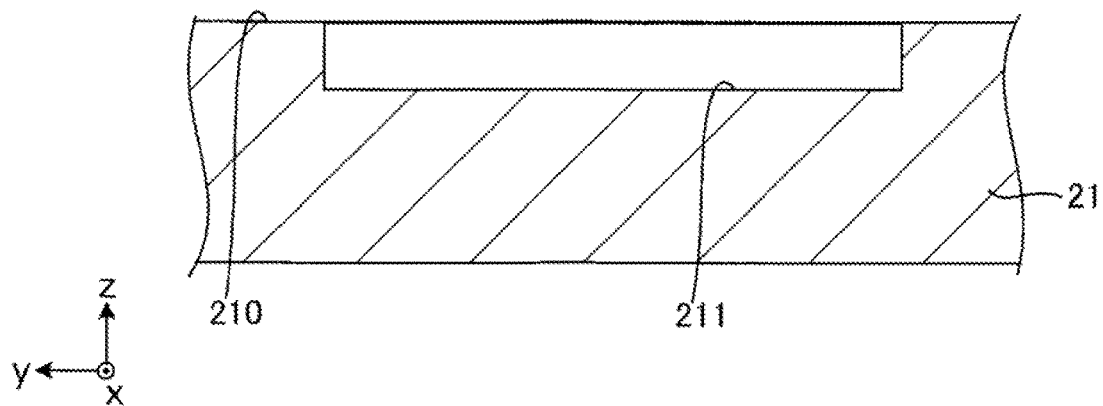
FIG. 11 is a cross-sectional view for explaining a substrate forming step according to the first exemplary embodiment.

FIG. 11 is a cross-sectional view for explaining a substrate forming step according to the first exemplary embodiment. First, in the substrate forming step S11, for example, etching is performed to a flat plate configured by a glass plate, a quartz plate, or the like, to form a recessed portion 211 as illustrated in FIG. 11, thereby forming the substrate 21. In addition, in this step, the recessed portion 215 illustrated in FIG. 9 is also formed, although detained illustration is not given.

Figure 12:
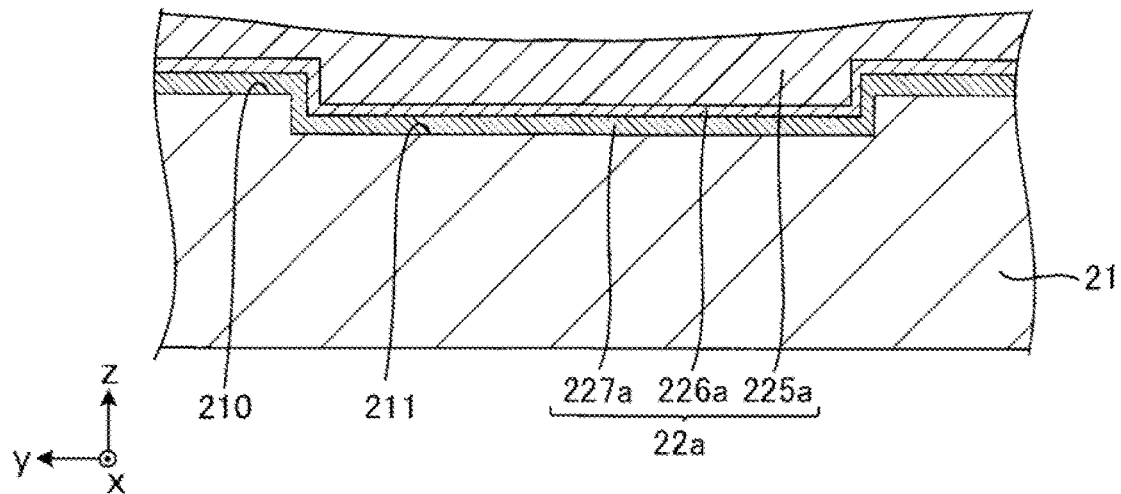
FIG. 12 is a cross-sectional view for explaining a light-shielding body forming step according to the first exemplary embodiment.
Figure 13:
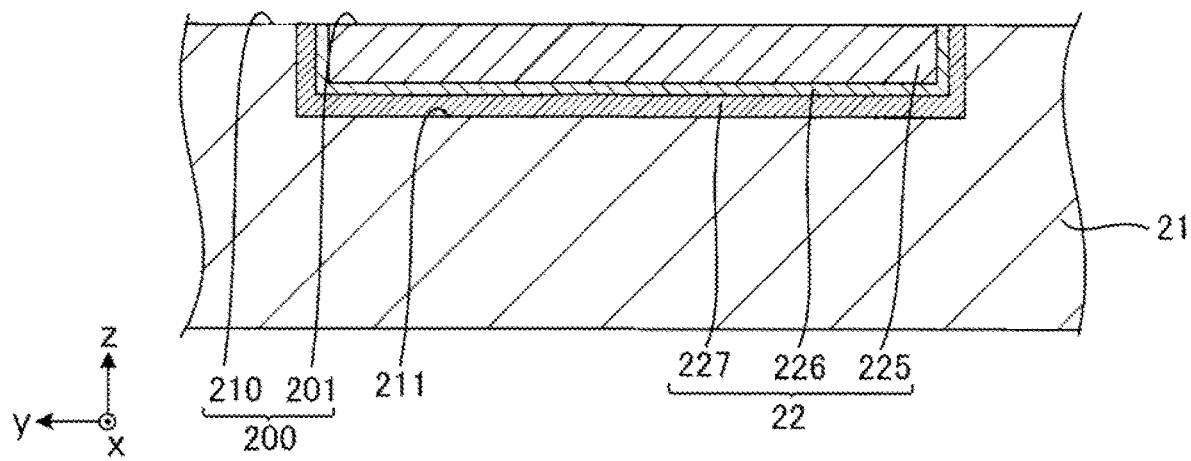
FIG. 13 is a cross-sectional view for explaining the light-shielding body forming step according to the first exemplary embodiment.

FIGS. 12 and 13 are cross-sectional views for explaining the light-shielding body forming step according to the first exemplary embodiment. Next, in the light-shielding body forming step S12, for example, a composition for forming a tungsten silicide film is deposited in the recessed portion 211 using a CVD method or other vapor deposition method to form a tungsten silicide layer 227a. After this, a composition for forming a metal nitride film containing tungsten nitride or titanium nitride is deposited on the tungsten silicide layer 227a using a similar method to form a metal nitride layer 226a. After this, a composition for forming a metal film containing tungsten is deposited on the metal nitride layer 226a using a similar method to form a metal layer 225a. By forming each of the metal layer 225a, the metal nitride layer 226a, and the tungsten silicide layer 227a, a light shielding layer 22a illustrated in FIG. 12 is formed.

Next, a planarization step using polishing such as chemical mechanical polishing (CMP) is applied to the light shielding layer 22a to form the light-shielding body 22 illustrated in FIG. 13. By applying polishing such as CMP, it is possible to easily form the planar surface 200 configured by the surface 220 of the light-shielding body 22 and the surface 210 of the substrate 21.

In addition, although detailed illustration is not given, in the circuit light-shielding body forming step S13, the circuit light-shielding body 27 is formed using a method similar to the method used in the light-shielding body forming step S12.

Furthermore, in the step S14 for forming a wiring line or the like, the TFT 25, the scanning line 261, the signal line 262, the capacitance line 263, the storage capacitor 264, and the first to eighth interlayer insulating layers 231 to 238 are formed, although detailed illustration is not given. The TFT 25, the scanning line 261, the signal line 262, the capacitance line 263, and the storage capacitor 264 are formed, for example, by forming a metal film using a sputtering method or vapor deposition method, and applying etching to the metal film using a resist mask. The first to eighth interlayer insulating layers 231 to 238 are formed in a manner such that an insulating film is formed through a vapor deposition method or the like, and a planarization process is applied to the insulating film, for example, using polishing such as CMP.

Furthermore, although detailed illustration is not given, in the pixel-electrode forming step S15, the pixel electrode 28 is formed on the eighth interlayer insulating layer 238. The pixel electrode 28 is formed, for example, in such a manner such that a layer made of a transparent conductive material is formed using a vapor deposition method such as a CVD method and then the layer is patterned using a mask.

Furthermore, although detailed illustration is not given, in the alignment-film forming step S16, the alignment film 29 is formed, for example, in a manner that a layer made of polyimide is formed using a vapor deposition method such as a CVD method and then a rubbing treatment is performed to the layer.

In the manner as described above, the element substrate 2 illustrated in FIG. 4 can be formed. In addition, the counter substrate 3 is formed, for example, using a known technology as appropriate, and the counter substrate 3 is coupled to the element substrate 2 via the sealing member 4. Subsequently, a liquid crystal material is injected between the element substrate 2, the counter substrate 3, and the sealing member 4 to form the liquid crystal layer 5. And after this, sealing is performed. Further, a various type of circuits and the like are appropriately formed as well. In such a manner, the electro-optical device 1 illustrated in FIGS. 1 and 2 can be manufactured.

As described above, through manufacturing the element substrate 2, the light-shielding body 22 is formed using a method in which: the recessed portion 211 is formed in the substrate 21, a composition for forming a tungsten silicide film, a composition for forming a metal nitride film, and a composition for forming a metal film are sequentially deposited on the recessed portion 211 to form the light shielding layer 22a, and then, a planarization process such as CMP is applied. In other words, the light-shielding body 22 is formed using a so-called damascene method. Using the damascene method, it is possible to easily form the planar surface 200 and enhance a smoothness of the planar surface 200. In addition, using the damascene method, it is possible to reduce occurrence of, for example, crack in the light-shielding body 22, as compared with, for example, a method in which a light-shielding body is formed by forming a light shielding film on the substrate 21 without forming the recessed portion 211 in the substrate 21, and applying etching on the formed light shielding film. In other words, by using the damascene method, it is possible to enhance the resistance of the light-shielding body 22 to cracking.

Furthermore, in the case of the element substrate 2 including plural pixel electrodes 28 and TFTs 25, to form an element substrate 2 having a reduced size and exhibiting high quality, it is desired for the light-shielding body 22 to have a very small size and exhibit excellent accuracy in shape With the damascene method described above, it is possible to form the light-shielding body 22 having a very small size and exhibiting excellent accuracy in shape.

1-2. Second Exemplary Embodiment

Figure 14:
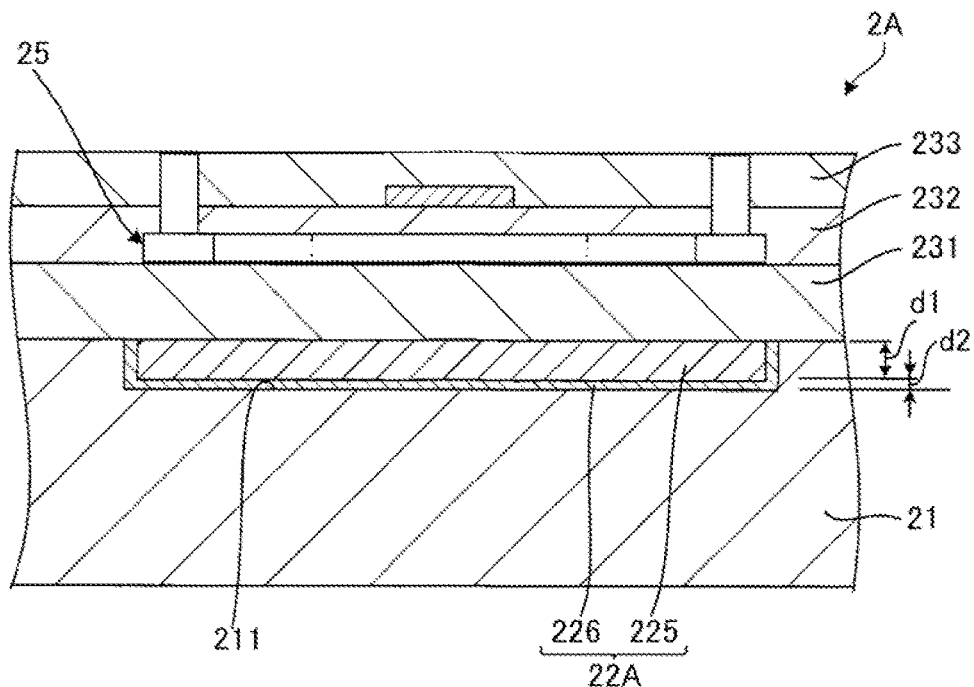
FIG. 14 is an enlarged cross-sectional view illustrating an element substrate according to a second exemplary embodiment.

Next, a second exemplary embodiment of the present disclosure will be described below. FIG. 14 is an enlarged cross-sectional view illustrating an element substrate according to the second exemplary embodiment.

The present exemplary embodiment is similar to the first exemplary embodiment except, mainly, that the configurations of the light shielding bodies are different from each other. Note that, in the descriptions below, the second exemplary embodiment will be described with focus being placed on things differing from those in the first exemplary embodiment, and descriptions of similar matters will not be repeated. In addition, in FIG. 14, the same reference characters are given to configurations similar to those in the first exemplary embodiment.

A light-shielding body 22A included in an element substrate 2A illustrated in FIG. 14 has a configuration in which the tungsten silicide film 227 is omitted from the light-shielding body 22 in the first exemplary embodiment. In other words, the light-shielding body 22A includes the metal film 225 and the metal nitride film 226. With the light-shielding body 22A being provided with the metal nitride film 226 that is in contact with the substrate 21, it is possible to enhance an adhesive property between the light-shielding body 22B and the substrate 21, as compared when the light-shielding body 22A does not include the metal nitride film 226, and is configured only with the metal film 225.

Even with the present exemplary embodiment, it is possible to prevent light from entering the TFT 25 and enhance quality of the electro-optical device 1, as with the first exemplary embodiment.

1-3. Third Exemplary Embodiment

Figure 15:
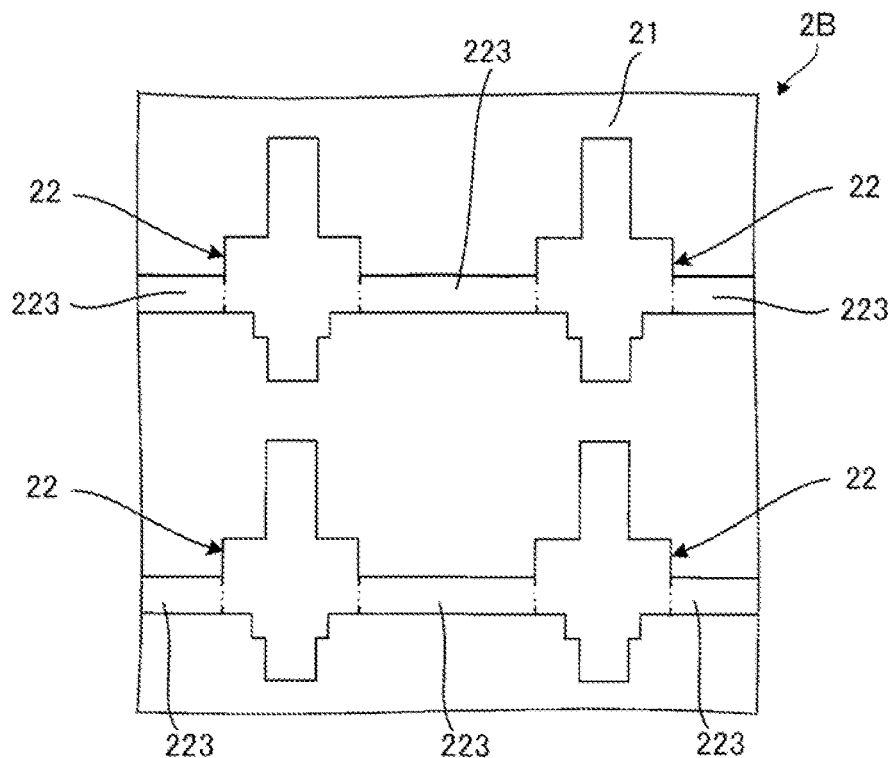
FIG. 15 is a plan view illustrating a light-shielding body included in an element substrate according to a third exemplary embodiment.

Next, a third exemplary embodiment of the present disclosure will be described below. FIG. 15 is a plan view illustrating a light-shielding body included in an element substrate according to the third exemplary embodiment.

The present exemplary embodiment is similar to the first exemplary embodiment except, mainly, that the configurations of the light shielding bodies are different from each other. Note that, in the descriptions below, the third exemplary embodiment will be described with focus being placed on things differing from those in the first exemplary embodiment, and descriptions of similar matters will not be repeated. In addition, in FIG. 15, the same reference numbers are given to configurations similar to those in the first exemplary embodiment.

An element substrate 2B illustrated in FIG. 15 includes a coupling portion 223 that couples adjacent light shielding bodies 22 together. In the present exemplary embodiment, a plurality of light shielding bodies 22 arranged alongside along the +x-axis direction are each coupled to an adjacent light-shielding body 22 through the coupling portion 223. More specifically, a light-shielding body 22 located on the upper left in FIG. 15 is coupled to a light-shielding body 22 located on the upper right in FIG. 15 through the coupling portion 223. In addition, a light-shielding body 22 located on the lower left in FIG. 15 is coupled to a light-shielding body 22 located on the lower right in FIG. 15 through the coupling portion 223.

With the adjacent light shielding bodies 22 being coupled to each other through the coupling portion 223 as illustrated in the drawing, it is possible to use the plurality of light shielding bodies 22 and the plurality of coupling portions 223 as scanning lines by electrically coupling the light-shielding body 22 and the gate electrode 251 of the TFT 25 together.

Even with the present exemplary embodiment, it is possible to prevent light from entering the TFT 25 and enhance quality of the electro-optical device 1, as with the first exemplary embodiment.

1-4. Fourth Exemplary Embodiment

Figure 16:
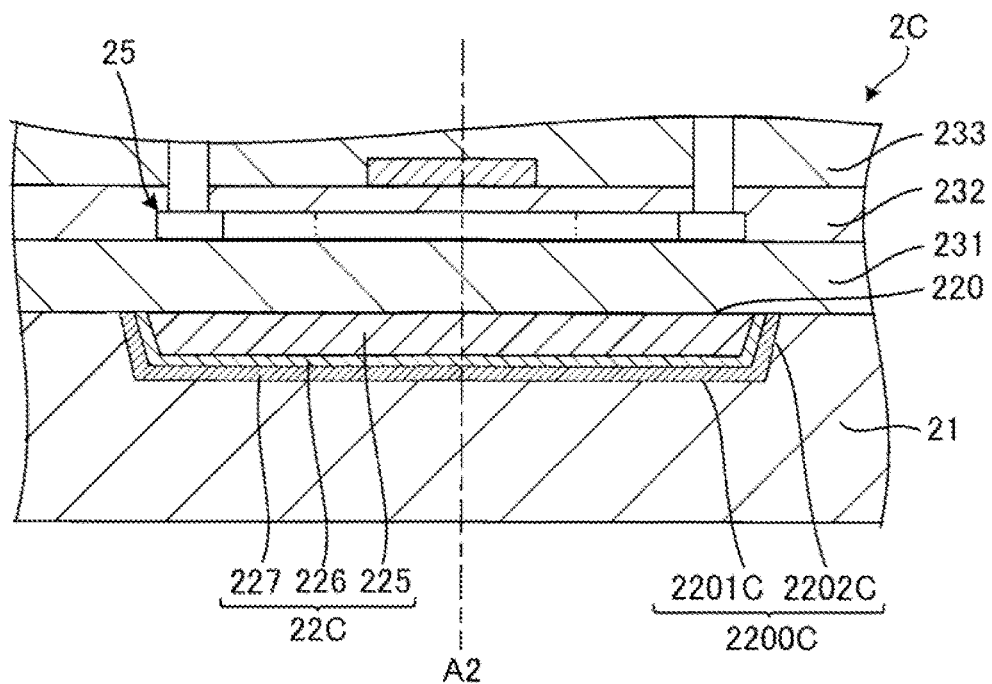
FIG. 16 is a cross-sectional view illustrating a light-shielding body included in an element substrate according to a fourth exemplary embodiment.

Next, a fourth exemplary embodiment of the present disclosure will be described below. FIG. 16 is a cross-sectional view illustrating a light-shielding body included in an element substrate according to the fourth exemplary embodiment.

The present exemplary embodiment is similar to the first exemplary embodiment except, mainly, that the configurations of the light shielding bodies are different from each other. Note that, in the descriptions below, the fourth exemplary embodiment will be described with focus being placed on things differing from those in the first exemplary embodiment, and descriptions of similar matters will not be repeated. In addition, in FIG. 16, the same reference numbers are given to configurations similar to those in the first exemplary embodiment.

A light-shielding body 22C included in an element substrate 2C illustrated in FIG. 16 has a shape having a width continuously increasing with distance from the pixel electrode 28, in other words, has a tapered shape.

A contacting surface 2200C of the light-shielding body 22C that is in contact with the substrate 21 includes a bottom surface 2201C and a side surface 2202C. Note that the bottom surface 2201C is a surface of the substrate 21 on the −z-axis side, and the side surface 2202C is a surface that links the surface 220 on the +z-axis side and the bottom surface 2201C together. In addition, the side surface 2202C is inclined relative to the line A2 extending along the thickness direction of the substrate 21.

Furthermore, the side surface 2202C does not overlap with the channel region 2501, the first LDD region 2504, or the second LDD region 2505. A portion of the light-shielding body 22C where the side surface 2202C is located in a plan view has a thickness thinner than that of a portion where the side surface 2202 is not located in a plan view. Thus, by configuring the side surface 2202C not to overlap with the channel region 2501, the first LDD region 2504, or the second LDD region 2505 in a plan view, it is possible to particularly effectively reduce malfunction of the TFT 25 due to leakage current.

Furthermore, since the light-shielding body 22C has a shape having a width continuously increasing with distance from the pixel electrode 28, the angle formed by the bottom surface 2201C and the side surface 2202C exceeds 90°. When this angle exceeds 90°, it is possible to reduce the possibility that the light-shielding body 22C peels off from the substrate 21 at the boundary between the bottom surface 2201C and the side surface 2202C, for example, at the time of manufacturing, as compared when the angle is equal to or less than 90°. Thus, it is possible to enhance the adhesive property between the light-shielding body 22C and the substrate 21.

Note that, in the drawing, the width of the light-shielding body 22C expands at a constant expanding rate. However, the expanding rate may not be constant.

Even with the present exemplary embodiment, it is possible to prevent light from entering the TFT 25 and enhance quality of the electro-optical device 1, as with the first exemplary embodiment.

1-5. Fifth Exemplary Embodiment

Figure 17:
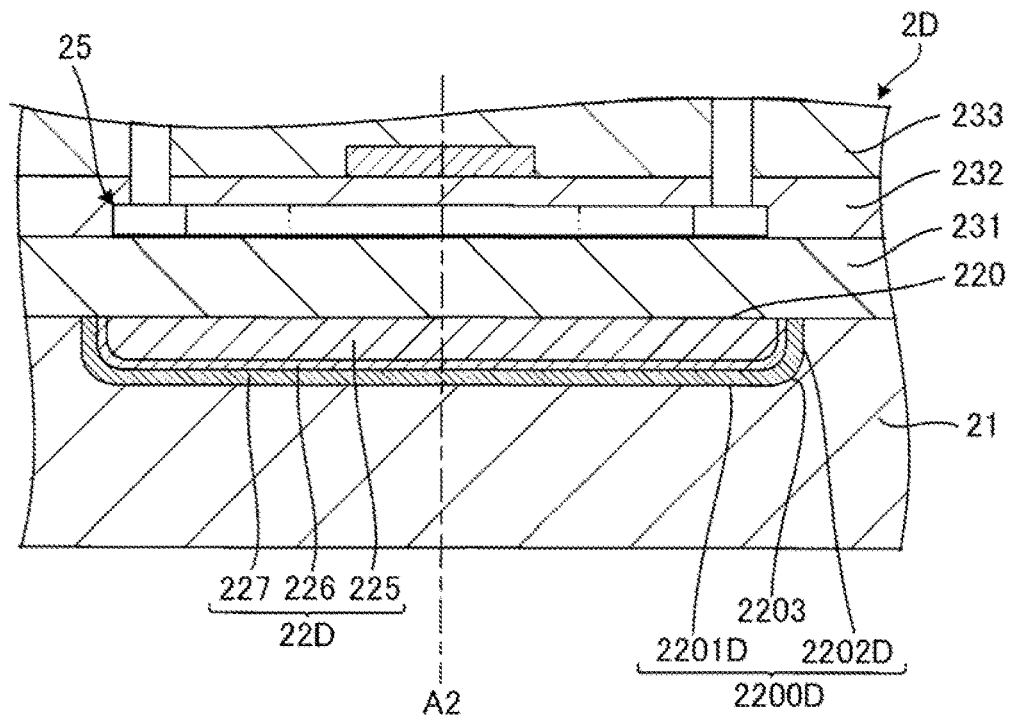
FIG. 17 is a cross-sectional view illustrating a light-shielding body included in an element substrate according to a fifth exemplary embodiment.

Next, a fifth exemplary embodiment of the present disclosure will be described. FIG. 17 is a cross-sectional view illustrating a light-shielding body included in an element substrate according to the fifth exemplary embodiment.

The present exemplary embodiment is similar to the first exemplary embodiment except, mainly, that the shapes of the contacting surfaces of the light shielding bodies are different from each other. Note that, in the descriptions below, the fifth exemplary embodiment will be described with focus being placed on things differing from those in the first exemplary embodiment, and descriptions of similar matters will not be repeated. In addition, in FIG. 17, the same reference characters are given to configurations similar to those in the first exemplary embodiment.

In an element substrate 2D illustrated in FIG. 17, a contacting surface 2200D of a light-shielding body 22D is in contact with the substrate 21, and includes a bottom surface 2201D and a side surface 2202D. The side surface 2202D is in parallel to the line A2 extending along the thickness direction of the substrate 21.

A coupling portion 2203 of the bottom surface 2201D is coupled with the side surface 2202D, and has a curved-surface shape. In other words, the contacting surface 2200D of the light-shielding body 22D that is in contact with the substrate 21 includes the coupling portion 2203, and the coupling portion 2203 forms a "curved-surface portion" having a curved-surface shape. With the coupling portion 2203 being provided, it is possible to enhance an adhesive property between the light-shielding body 22D and the substrate 21, as compared when the coupling portion 2203 is not provided.

Even with the present exemplary embodiment, it is possible to prevent light from entering the TFT 25 and enhance quality of the electro-optical device 1, as with the first exemplary embodiment.

1-6. Sixth Exemplary Embodiment

Figure 18:
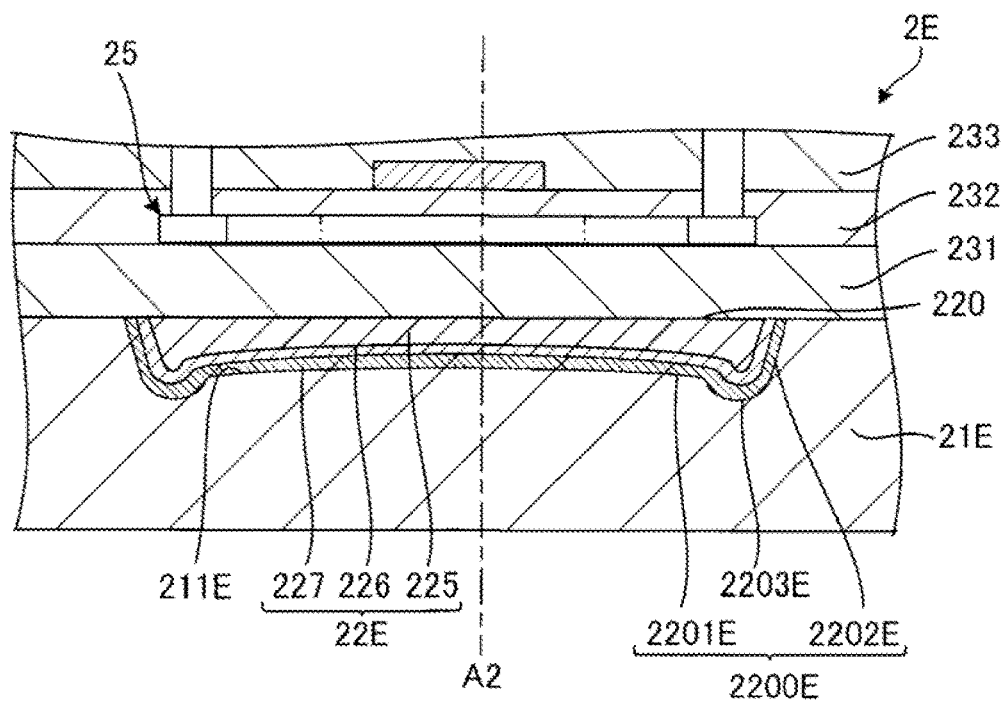
FIG. 18 is a cross-sectional view illustrating a light-shielding body included in an element substrate according to a sixth exemplary embodiment.

Next, a sixth exemplary embodiment of the present disclosure will be described. FIG. 18 is a cross-sectional view illustrating a light-shielding body included in an element substrate according to the sixth exemplary embodiment.

The present exemplary embodiment is similar to the fifth exemplary embodiment except, mainly, that the shapes of the contacting surfaces of the light shielding bodies are different from each other. Note that, in the descriptions below, the sixth exemplary embodiment will be described with focus being placed on things differing from those in the first exemplary embodiment, and descriptions of similar matters will not be repeated. In addition, in FIG. 18, the same reference characters are given to configurations similar to those in the first exemplary embodiment.

A contacting surface 2200E of a light-shielding body 22E included in an element substrate 2E illustrated in FIG. 18 includes a bottom surface 2201E and a side surface 2202E. The side surface 2202E is inclined relative to the line A2 extending along the thickness direction of the substrate 21.

A coupling portion 2203E of the bottom surface 2201E is coupled with the side surface 2202E, and has a curved-surface shape that protrudes toward a side opposite to the pixel electrode 28. In addition, a portion of the bottom surface 2201E except for the coupling portion 2203E has a curved-surface shape that protrudes toward the pixel electrode 28 side. In the present exemplary embodiment, the contacting surface 2200E forms a "curved-surface portion" in which the bottom surface 2201D has a curved-surface shape. With the present exemplary embodiment, as the bottom surface 2201E has a curved-surface shape, it is possible to enhance the adhesive property between the light-shielding body 22E and the substrate 21, as compared when the bottom surface 2201E does not have a curved-surface shape.

Even with the present exemplary embodiment, it is possible to prevent light from entering the TFT 25 and enhance quality of the electro-optical device 1, as with the first exemplary embodiment.

1-7. Seventh Exemplary Embodiment

Figure 19:
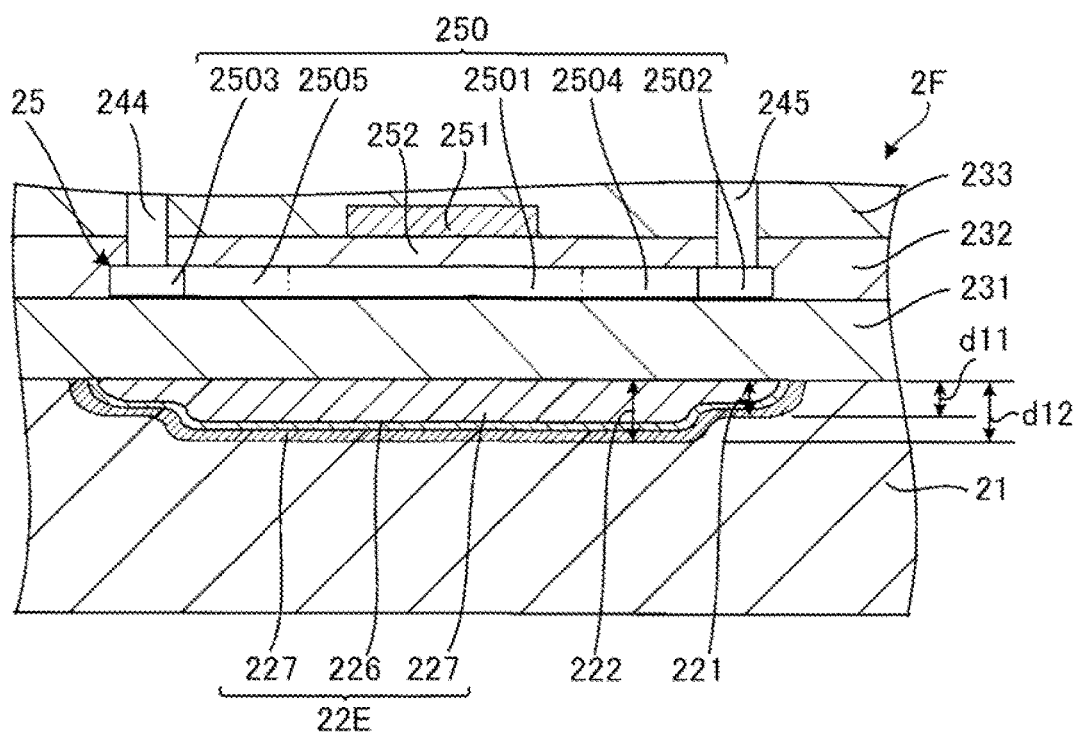
FIG. 19 is a cross-sectional view illustrating a light-shielding body included in an element substrate according to a seventh exemplary embodiment.
Figure 20:
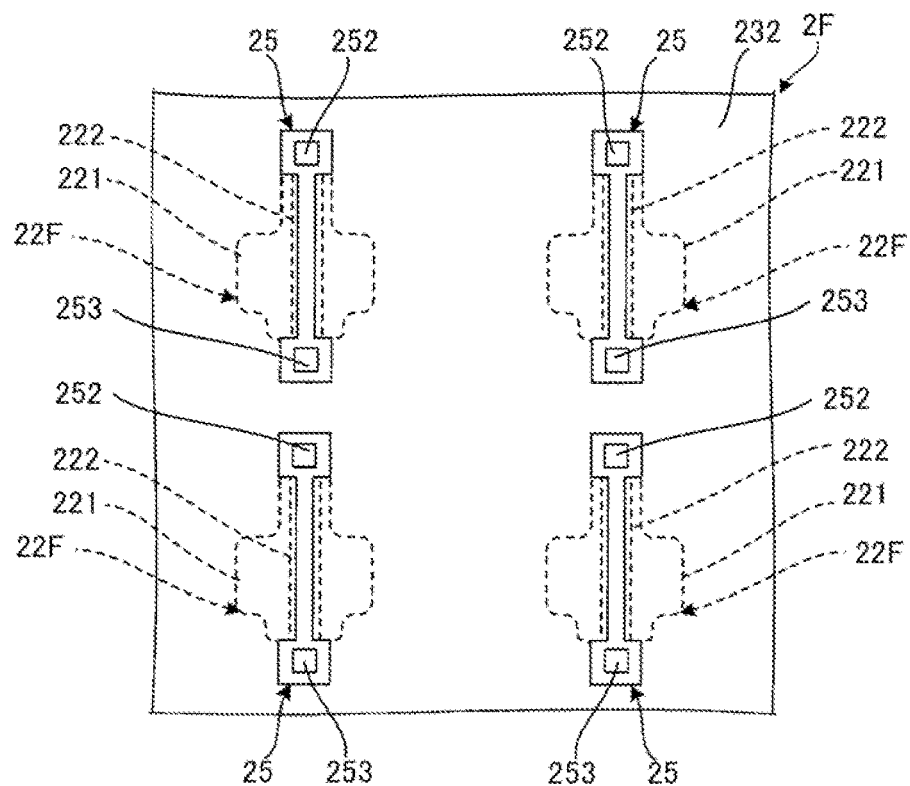
FIG. 20 is a plan view illustrating the element substrate according to the seventh exemplary embodiment.

Next, a seventh exemplary embodiment of the present disclosure will be described. FIG. 19 is a cross-sectional view illustrating a light-shielding body included in an element substrate according to the seventh exemplary embodiment. FIG. 20 is a plan view illustrating the light-shielding body included in the element substrate according to the seventh exemplary embodiment.

The present exemplary embodiment is similar to the first exemplary embodiment except, mainly, that the configurations of the light shielding bodies are different from each other. Note that, in the descriptions below, the sixth exemplary embodiment will be described with focus being placed on things differing from those in the first exemplary embodiment, and descriptions of similar matters will not be repeated. In addition, in FIGS. 19 and 20, the same reference characters are given to configurations similar to those in the first exemplary embodiment.

A light-shielding body 22F included in an element substrate 2F illustrated in FIGS. 19 and 20 includes a first portion 221 and a second portion 222. In the drawing, the second portion 222 has a rectangular shape along the +y-axis direction in a plan view. On the other hand, the first portion 221 has a longitudinal shape along the +y-axis direction in a plan view, and surrounds the second portion 222, as illustrated in FIG. 20. In addition, as illustrated in FIG. 19, the thickness d11 of the first portion 221 is thinner than the thickness d12 of the second portion 222. A surface 220 of the light-shielding body 22 on the +z-axis side is located on the same plane as the surface 210 of the substrate 21 on the +z-axis side.

Furthermore, the second portion 222 overlaps with the channel region 2501, the first LDD region 2504, and the second LDD region 2505 in a plan view. The channel region 2501, the first LDD region 2504, and the second LDD region 2505 are portions that particularly need to have the light shielding property as described above. For this reason, by configuring the second portion 222 to overlap with the channel region 2501, the first LDD region 2504, and the second LDD region 2505 in a plan view, it is possible to particularly effectively prevent malfunction of the TFT 25 due to leakage current. In addition, as the light-shielding body 22F includes the first portion 221, it is possible to reduce malfunction such as warpage of the element substrate 2F and cracking of the light-shielding body 22F.

Note that the light-shielding body 22F described above can be formed, for example, using a so-called dual damascene method.

Even with the present exemplary embodiment, it is possible to prevent light from entering the TFT 25 and enhance quality of the electro-optical device 1, as with the first exemplary embodiment.

2. Electronic Apparatus

The electro-optical device 1 can be used in various electronic apparatuses.

Figure 21:
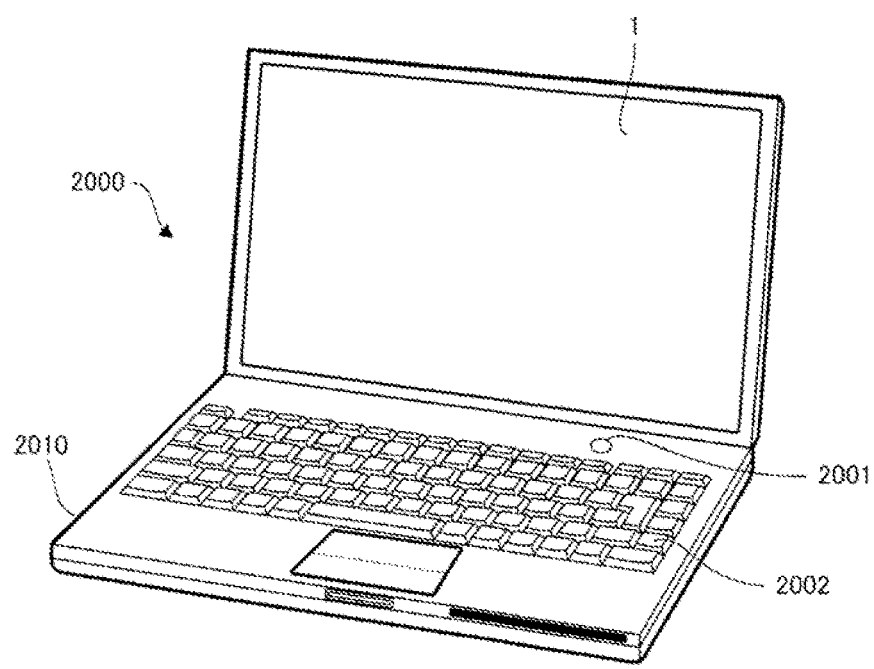
FIG. 21 is a perspective view illustrating a personal computer serving as one example of an electronic apparatus.

FIG. 21 is a perspective view illustrating a personal computer serving as one example of an electronic apparatus. The personal computer 2000 includes the electro-optical device 1 that displays various images, and a main body portion 2010 in which a power supply switch 2001 and a keyboard 2002 are provided.

Figure 22:
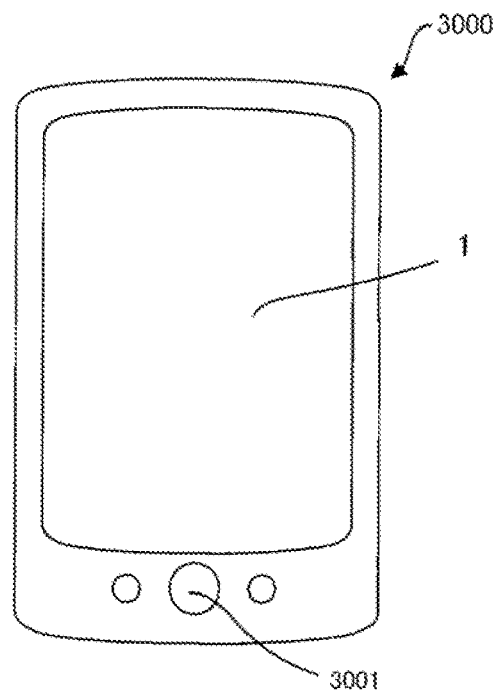
FIG. 22 is a perspective view illustrating a smartphone serving as one example of an electronic apparatus.

FIG. 22 is a perspective view illustrating a smartphone serving as one example of an electronic apparatus. A smartphone 3000 includes an operation input button 3001, and the electro-optical device 1 that displays various images. The content of screen displayed on the electro-optical device 1 changes in response to operation to the operation input button 3001.

Figure 23:
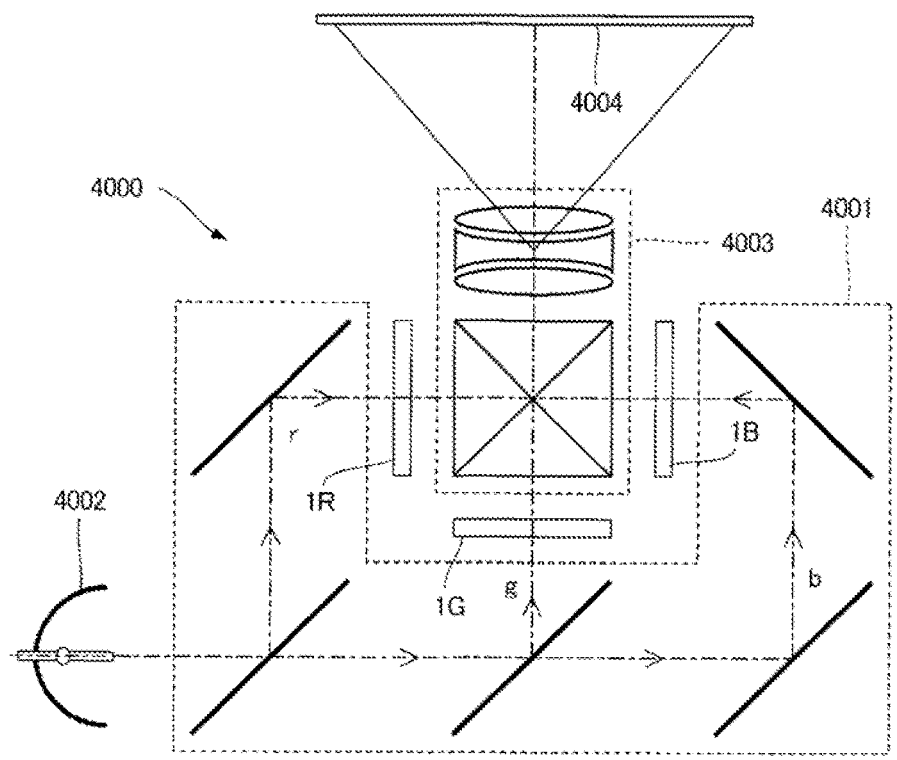
FIG. 23 is a schematic view illustrating a projector serving as one example of an electronic apparatus.

FIG. 23 is a schematic view illustrating a projector serving as one example of an electronic apparatus. A projection-type display device 4000 is, for example, a three-plate type projector. An electro-optical device 1R is an electro-optical device 1 that corresponds to a red display color. An electro-optical device 1G is an electro-optical device 1 that corresponds to a green display color. An electro-optical device 1B is an electro-optical device 1 that corresponds to a blue display color. In other words, the projection-type display device 4000 includes three electro-optical devices 1R, 1G, and 1B that correspond to a red display color, a green display color, and a blue display color, respectively.

An illumination optical system 4001 supplies the electro-optical device 1R with a red element r of light emitted from an illumination device 4002 serving as a light source, supplies a green element g to the electro-optical device 1G, and supplies a blue element b to the electro-optical device 1B. Each of the electro-optical devices 1R, 1G, and 1B functions as a light valve or other optical modulators that modulate each of the monochromatic lights in accordance with a display image, the monochromatic lights being supplied from the illumination optical system 4001. A projection optical system 4003 combines the light emitted from each of electro-optical devices 1R, 1G, and 1B, and projects the combined light to a projection surface 4004.

The personal computer 2000, the smartphone 3000, and the projection-type display device 4000 described above each include the electro-optical device 1 described above. With the electro-optical device 1 being provided, it is possible to enhance the evenness of display of the personal computer 2000, the smartphone 3000, and the projection-type display device 4000. Thus, it is possible to enhance the quality of the personal computer 2000, the smartphone 3000, and the projection-type display device 4000.

Note that the electronic apparatus to which the present disclosure is applied is not limited to the devices described as examples, and includes, for example, a personal digital assistant (PDA), a digital still camera, a television, a video camera, a car navigation device, a display unit mounted on a vehicle, an electronic organizer, an electronic paper, a calculator, a word processor, a work station, a video phone, a point of sale (POS) terminal, and the like. In addition, the electronic apparatus to which the present disclosure is applied includes a printer, a scanner, a copy machine, a video player, an apparatus with touch screen, and the like.

These are descriptions of the electro-optical device and the electronic apparatus according to the present disclosure based on preferred exemplary embodiments. However, the present disclosure is not limited to the exemplary embodiments described above. In addition, the configuration of each component of the present disclosure may be replaced with any configuration that exerts a function similar to that in the above-described exemplary embodiments, and any configuration or configurations may be added to the configuration of each components of the present disclosure.

Furthermore, in the description above, a liquid crystal device has been described as one example of the electro-optical device according to the present disclosure. However, the electro-optical device according to the present disclosure is not limited to this. In other words, it is only necessary that the electro-optical device according to the present disclosure is an electro-optical device of which optical properties change according to electric energy. For example, as with the exemplary embodiments described above, the present disclosure may be applicable to a display panel that employs a light-emitting element such as an organic electro luminescence (EL), an inorganic EL, and a light-emitting polymer.

Furthermore, as with the exemplary embodiments described above, the present disclosure may be applicable to an electrophoretic display panel that employs microcapsules containing colored liquid and white particles dispersed in the liquid.

Furthermore, in the description above, the TFT is used as one example of the switching element but the switching element is not limited to the TFT. For example, a metal-oxide-semiconductor field-effect transistor (MOSFET) or the like may be used.

Furthermore, the electro-optical device according to the present disclosure is not limited to a transmissive type, and may be of a reflective type.

What is claimed is:

1. An electro-optical device, comprising:
a pixel electrode that is light-transmissive;
a substrate that is light-transmissive and that is provided with a recessed portion open toward the pixel electrode side;
a light-shielding body in the recessed portion; and
a switching element overlapping, in a plan view from a thickness direction of the substrate, the light-shielding body, the switching element being electrically coupled to the pixel electrode, wherein
the constituent material of the substrate is a silicon-based inorganic compound, and
the light-shielding body includes
a tungsten silicide film, a recessed portion side of the tungsten silicide film being in contact with the silicon-based inorganic compound of the recessed portion,
a tungsten nitride film, a tungsten silicide film side of the tungsten nitride film being in contact with the tungsten silicide film, and
a tungsten film, a tungsten nitride film side of the tungsten film being in contact with the tungsten nitride film, and the tungsten film being thicker than a thickness of the tungsten nitride film and the tungsten silicide film.

2. The electro-optical device according to claim 1, wherein
a thickness of the tungsten silicide film is thicker than a thickness of the tungsten nitride film.

3. The electro-optical device according to claim 1, wherein
a surface of the substrate on the pixel electrode side and a surface of the light-shielding body on the pixel electrode side form a planar surface.

4. The electro-optical device according to claim 1, wherein
the light-shielding body has a shape having a width continuously increasing with distance from the pixel electrode.

5. The electro-optical device according to claim 1, wherein
a contacting surface of the light-shielding body in contact with the substrate includes a curved-surface portion having a curved-surface shape.

6. An electronic apparatus comprising the electro-optical device according to claim 1.

7. An electro-optical device, comprising:
a pixel electrode that is light-transmissive;
a base material that is light-transmissive and that includes a recessed portion open toward a pixel electrode side;
a light-shielding body in a recessed portion open toward the pixel electrode side; and
a switching element electrically coupled to the pixel electrode and overlapping, in a plan view from a thickness direction of the base material, the light-shielding body, wherein
the base material is a silicon-based inorganic compound, and
the light-shielding body includes
a tungsten silicide film, a recessed portion side of the tungsten silicide film being in contact with the silicon-based inorganic compound of the recessed portion,
a tungsten nitride film, a tungsten silicide film side of the tungsten nitride film being in contact with the tungsten silicide film, and
a tungsten film, a tungsten nitride film side of the tungsten film being in contact with the tungsten nitride film, and the tungsten film being thicker than a thickness of the tungsten nitride film and the tungsten silicide film.

8. The electro-optical device according to claim 7, wherein
a thickness of the tungsten silicide film is thicker than a thickness of the metal tungsten nitride film.

9. The electro-optical device according to claim 7, wherein a surface of the substrate on the pixel electrode side and a surface of the light-shielding body on the pixel electrode side form a planar surface.

10. The electro-optical device according to claim 7, wherein the light-shielding body has a shape having a width continuously increasing with distance from the pixel electrode.

11. The electro-optical device according to claim 7, wherein a contacting surface of the light-shielding body in contact with the substrate includes a curved-surface portion having a curved-surface shape.

12. An electronic apparatus comprising the electro-optical device according to claim 7.

* * * * *